United States Patent
Rezvani et al.

(10) Patent No.: US 7,734,724 B2
(45) Date of Patent: Jun. 8, 2010

(54) AUTOMATED UPLOAD OF CONTENT BASED ON CAPTURED EVENT

(75) Inventors: Babak Rezvani, New York, NY (US); Jack L. Chen, Astoria, NY (US); Edward B. Kalin, Easton, CT (US); Reza Jalili, Bronxville, NY (US)

(73) Assignee: Xanboo Inc., New York, NY (US)

( * ) Notice: Subject to any disclaimer, the term of this patent is extended or adjusted under 35 U.S.C. 154(b) by 628 days.

(21) Appl. No.: 09/775,882

(22) Filed: Feb. 2, 2001

(65) Prior Publication Data
US 2003/0140090 A1 Jul. 24, 2003

Related U.S. Application Data

(60) Provisional application No. 60/247,183, filed on Nov. 10, 2000, provisional application No. 60/230,305, filed on Sep. 6, 2000.

(51) Int. Cl.
G06F 15/16 (2006.01)
(52) U.S. Cl. .................. 709/219; 709/216; 709/217; 709/224
(58) Field of Classification Search ......... 709/223–226, 709/217–220, 203; 707/1, 10
See application file for complete search history.

(56) References Cited

U.S. PATENT DOCUMENTS

| | | | |
|---|---|---|---|
| 3,812,462 A | 5/1974 | Crossland et al. | 340/163 |
| 4,977,612 A | 12/1990 | Wilson | 455/166 |
| 4,990,890 A | 2/1991 | Newby | 340/539 |
| 5,291,193 A | 3/1994 | Isobe et al. | 340/825.69 |
| 5,574,965 A | 11/1996 | Welmer | 455/3.2 |
| 5,594,858 A | 1/1997 | Blevins | |
| 5,689,442 A | 11/1997 | Swanson et al. | 364/550 |
| 5,754,765 A | 5/1998 | Danneels et al. | 395/200.1 |
| 5,802,467 A | 9/1998 | Salazar et al. | 455/420 |
| 5,812,394 A | 9/1998 | Lewis et al. | |
| 5,815,086 A | 9/1998 | Ivie et al. | 340/825.52 |
| 5,817,993 A | 10/1998 | Kamani et al. | 187/316 |
| 5,818,845 A | 10/1998 | Moura et al. | 370/449 |
| 5,829,444 A | 11/1998 | Ferre et al. | 128/897 |
| 5,857,152 A | 1/1999 | Everett | 455/406 |
| 5,859,852 A | 1/1999 | Moura et al. | 370/449 |
| 5,872,928 A | 2/1999 | Lewis et al. | 395/200.52 |
| 5,898,386 A | 4/1999 | Kaihatsu | 340/825.69 |
| 5,963,624 A | 10/1999 | Pope | 379/110.01 |
| 6,002,427 A * | 12/1999 | Kipust | 348/156 |
| 6,005,476 A | 12/1999 | Valiulis | 340/310.01 |
| 6,005,482 A | 12/1999 | Moran et al. | 340/568.8 |
| 6,006,039 A | 12/1999 | Steinberg et al. | 396/57 |
| 6,009,401 A | 12/1999 | Horstmann | 705/1 |
| 6,012,084 A | 1/2000 | Fielding et al. | 709/205 |

(Continued)

OTHER PUBLICATIONS

Office Action issued in U.S. Appl. No. 09/709,688 on Dec. 3, 2002 and Applicant's Response.

(Continued)

*Primary Examiner*—Shawki S Ismail
(74) *Attorney, Agent, or Firm*—Ropes & Gray LLP

(57) ABSTRACT

Systems and methods for automatically capturing, uploading, and publishing content. The system may include one or more monitoring modules for providing captured content to a remote site.

21 Claims, 20 Drawing Sheets

U.S. PATENT DOCUMENTS

| | | | |
|---|---|---|---|
| 6,020,881 A | 2/2000 | Naughton et al. | |
| 6,032,202 A | 2/2000 | Lea et al. | 710/8 |
| 6,035,323 A | 3/2000 | Narayen et al. | 709/201 |
| 6,061,738 A | 5/2000 | Osaku et al. | |
| 6,069,655 A * | 5/2000 | Seeley et al. | 348/154 |
| 6,098,116 A | 8/2000 | Nixon et al. | 710/8 |
| 6,134,606 A | 10/2000 | Anderson et al. | 710/14 |
| 6,147,601 A | 11/2000 | Sandelman et al. | 340/506 |
| 6,163,316 A | 12/2000 | Killian | 345/327 |
| 6,166,729 A * | 12/2000 | Acosta et al. | 715/719 |
| 6,182,094 B1 | 1/2001 | Humpleman et al. | |
| 6,198,408 B1 | 3/2001 | Cohen | 340/825.69 |
| 6,202,210 B1 | 3/2001 | Ludtke | 725/20 |
| 6,212,556 B1 | 4/2001 | Arunachalam | 709/219 |
| 6,218,953 B1 | 4/2001 | Petite | 340/641 |
| 6,219,702 B1 | 4/2001 | Ikehara et al. | 709/224 |
| 6,233,428 B1 * | 5/2001 | Fryer | 434/308 |
| 6,236,997 B1 | 5/2001 | Bodamer et al. | |
| 6,237,049 B1 | 5/2001 | Ludtke | 710/8 |
| 6,243,000 B1 | 6/2001 | Tsui | 340/5.21 |
| 6,275,490 B1 | 8/2001 | Mattaway et al. | 370/352 |
| 6,275,997 B1 | 8/2001 | Richardson | |
| 6,286,038 B1 | 9/2001 | Reichmeyer et al. | 709/220 |
| 6,288,716 B1 | 9/2001 | Humpleman et al. | |
| 6,292,830 B1 | 9/2001 | Taylor et al. | 709/224 |
| 6,298,332 B1 | 10/2001 | Montague | 705/27 |
| 6,311,197 B2 | 10/2001 | Mighdoll et al. | |
| 6,330,597 B2 | 12/2001 | Collin et al. | |
| 6,385,772 B1 * | 5/2002 | Courtney | 725/105 |
| 6,388,579 B1 | 5/2002 | Adcox et al. | 340/902 |
| 6,411,724 B1 * | 6/2002 | Vaithilingam et al. | 382/100 |
| 6,564,380 B1 * | 5/2003 | Murphy | 725/86 |
| 6,584,466 B1 * | 6/2003 | Serbinis et al. | 707/10 |
| 6,591,279 B1 * | 7/2003 | Emens et al. | 707/201 |
| 6,606,117 B1 * | 8/2003 | Windle | 348/239 |
| 6,636,259 B1 * | 10/2003 | Anderson et al. | 348/211.3 |
| 6,654,782 B1 * | 11/2003 | O'Brien et al. | 709/201 |
| 6,680,730 B1 | 1/2004 | Shields et al. | |
| 6,698,021 B1 * | 2/2004 | Amini et al. | 725/105 |
| 6,710,790 B1 | 3/2004 | Fagioli | |
| 6,715,003 B1 * | 3/2004 | Safai | 710/33 |
| 6,803,945 B1 * | 10/2004 | Needham | 348/207.1 |
| 6,907,387 B1 * | 6/2005 | Reardon | 702/188 |
| 6,930,709 B1 * | 8/2005 | Creamer et al. | 348/211.3 |
| 6,954,859 B1 * | 10/2005 | Simerly et al. | 726/3 |
| 7,010,144 B1 * | 3/2006 | Davis et al. | 382/100 |
| 7,117,519 B1 * | 10/2006 | Anderson et al. | 725/105 |
| 7,209,955 B1 * | 4/2007 | Major et al. | 709/207 |
| 7,231,592 B2 | 6/2007 | Humpleman | |
| 7,272,845 B2 * | 9/2007 | Creamer et al. | 725/105 |
| 7,287,088 B1 * | 10/2007 | Anderson | 709/235 |
| 2002/0058499 A1 | 5/2002 | Ortiz | |
| 2002/0169914 A1 | 11/2002 | Shteyn | |
| 2003/0234809 A1 | 12/2003 | Parker et al. | |
| 2004/0150546 A1 | 8/2004 | Choi | |
| 2005/0007454 A1 * | 1/2005 | Needham | 348/143 |

OTHER PUBLICATIONS

Office Action issued in U.S. Appl. No. 09/709,688 on Jun. 19, 2002 and Applicant's Response.
Office Action issued in U.S. Appl. No. 09/709,688 on Dec. 20, 2001 and Applicant's Response.
Office Action issued in U.S. Appl. No. 10/664,609 on Sep. 13, 2004 and Applicant's Response.
Office Action issued in U.S. Appl. No. 11/143,920 on Nov. 1, 2006 and Applicant's Response.
Office Action issued in U.S. Appl. No. 09/887,982 on Sep. 14, 2004 and Applicant's Response.
Office Action issued in U.S. Appl. No. 09/887,982 on Jun. 21, 2005 and Applicant's Response.
Office Action issued in U.S. Appl. No. 09/887,982 on Apr. 6, 2006 and Applicant's Response.
Office Action issued in U.S. Appl. No. 09/887,982 on Jan. 16, 2007 and Applicant's Response.
Office Action issued in U.S. Appl. No. 09/887,982 on Jan. 18, 2008 and Applicant's Response.
Office Action issued in U.S. Appl. No. 09/711,369 on Aug. 1, 2003.
Office Action issued in U.S. Appl. No. 09/711,369 on Nov. 17, 2003 and Applicant's Response.
Office Action issued in U.S. Appl. No. 09/711,369 on Apr. 9, 2004 and Applicant's Response.
Office Action issued in U.S. Appl. No. 09/711,369 on Mar. 4, 2005 and Applicant's Response.
Office Action issued in U.S. Appl. No. 09/711,369 on Nov. 16, 2005 and Applicant's Response.
Office Action issued in U.S. Appl. No. 09/711,369 on Jul. 28, 2006 and Applicant's Response.

* cited by examiner

AUTOMATED UPLOAD OF CONTENT BASED ON CAPTURED EVENT

CROSS REFERENCE TO RELATED APPLICATIONS

This application claims the benefit of Rezvani et al. U.S. provisional patent application Ser. No. 60/230,305, filed Sep. 6, 2000, and Rezvani et al. U.S. provisional patent application Ser. No. 60/247,183, filed Nov. 10, 2000, which are hereby incorporated by reference herein in their entirety.

BACKGROUND OF THE INVENTION

This invention relates to systems and methods for uploading captured content to a remote site. More particularly, this invention relates to systems and methods for capturing content in response to events and publishing the content at a remote site where it is accessible through a registered user account.

Systems exist for allowing users to capture content and provide it to a remote system. For example, it is common today for people to take pictures with digital cameras and provide the pictures to their friends via e-mail. Even this common operation can prove difficult to some users because of the complexity of the steps involved. For example, users first take a picture with a digital camera. The user must then upload the picture to their personal computer in a particular media format, launch an e-mail program, and generate a message with the intended recipient's correct address. The user then must locate the file, attach it to the e-mail, and send the e-mail.

Other schemes for providing locally captured content to a remote system can involve additional steps and complexity. Take for example, an approach for allowing people to post pictures or other locally-captured content to a web site. After a user e-mails a picture to the web site, a system administrator opens the email, accesses the attached media, performs any required formatting of the media in order to comply with the display environment of the web site, and the media may then be published to the web site. After the content is published to the web site, users may access the publicly accessible content using a web browser.

Approaches may become even more cumbersome to users when, for example, content is captured for users independent of their activity. Thus, it may be desirable to automate, and perhaps simplify, the capturing and publishing of content.

Whether or not automated, it may be desirable to publish locally captured content for remote access in other situations. For example, some modems allow users to set up voice-mail boxes for recording incoming messages. The messages are recorded in response to events (i.e., incoming calls). Users must, however, call into the voice-mail boxes to retrieve their messages. When the line is busy or when a failure occurs, such as when a user's personal computer loses power, the user cannot access his or her messages. Thus, for reliability, accessibility, or other reasons, it may be desirable to provide systems and methods for publishing content, which may be captured automatically or in response to user activity, on a remote system for access by the user.

It is therefore an object of the present invention to provide systems and methods for capturing content and publishing the content on a remote system. The capturing of the content, publishing of the content, or both, may be automated.

SUMMARY OF THE INVENTION

This and other objects of the invention are accomplished in accordance with the principles of the present invention by providing systems and methods for automatically capturing content, uploading the content to a remote site, associating the content with a user, and publishing content for access by a user. Various features in accordance with some embodiments of the present invention are described, for example in Rezvani et al. U.S. provisional patent application Ser. No. 06/247,183, filed Nov. 10, 2000, which is hereby incorporated by reference herein in its entirety.

The present invention may provide users with opportunities to access content published on one or more remote sites, such as one or more web servers, X windows servers, or other remote computes suitable for providing access to captured content. The published content may have been captured by one or more devices associated with the user's client system. The client system may include one or more monitoring modules that include processes for obtaining content from the devices. The devices may capture content in accordance with user commands, or may be triggered to capture content in response to events. For example, sensors may sense environmental conditions and trigger associated devices to capture content. In other suitable approaches, the devices may capture content continuously or periodically.

In some embodiments of the present invention, uploaded content may be published and associated with one or more user accounts, thereby establishing an affinity between the users associated with the account and the client system, monitoring module, or capture device. For example, the uploaded content may be associated with a single user account of a particular user. That user may give other users access to his or her account. In another suitable approach, content may be published to the accounts of multiple users for each user's access. Any other suitable approach may be used. In some embodiments of the present invention, content may be captured and uploaded to the remote site without using persistent storage in the client system. For example, content may be captured by a device, directly uploaded by the client system to the remote system, published using a web page script, and then stored for user access. In some embodiments, content may be persistently stored as the exclusive way of capturing and transmitting content. Still other embodiments may capture and automatically transmit content without persistently storing the content, and persistently store the content as a backup in case of a transmission failure.

Content may be wrapped with metadata that instructs the remote site how and what to do with the captured content. The metadata may also include an indication of a user, the device that captured the data, an associated monitoring module, or any other aspect of the client system. The remote system may associate the captured content with the user or the user's account based on the metadata.

BRIEF DESCRIPTION OF THE DRAWINGS

Further features of the invention, its nature, and various advantages will be more apparent from the accompanying drawings and the following detailed description of the preferred embodiments.

DETAILED DESCRIPTION OF THE PREFERRED EMBODIMENTS

Figure 1:
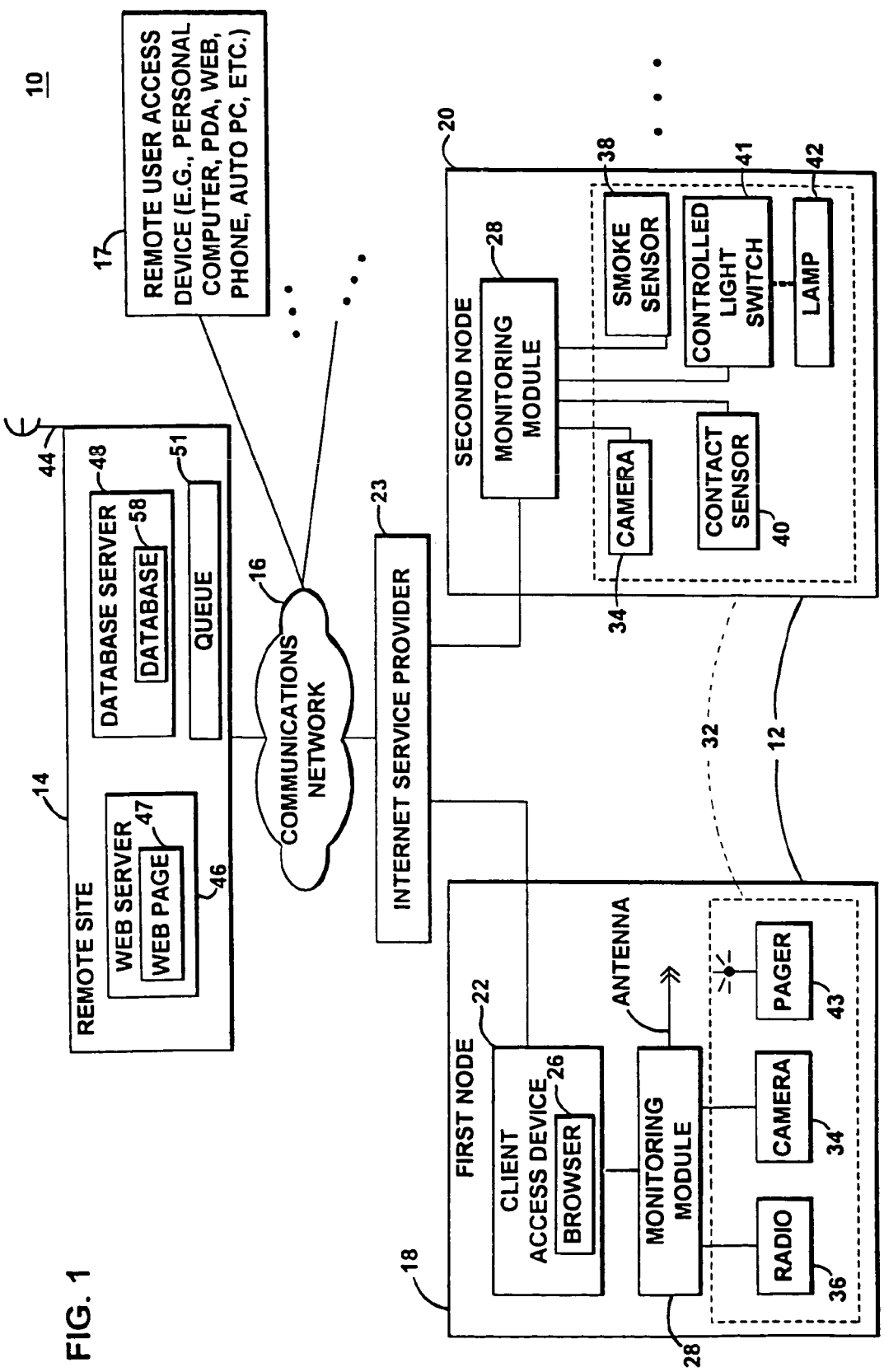
FIG. 1 is an illustrative schematic block diagram of an upload system architecture in accordance with an embodiment of the present invention.

FIG. 1 shows an illustrative system 10 in accordance with the present invention. For purposes of clarity, and not by way of limitation, an illustrative client-server based embodiment of the present invention is herein described, but any suitable peer-to-peer or other distributed approach may be used. System 10 may include an installation 12 and a remote site 14 that may be linked via a communications network 16. In practice, there may be more than one remote site 14 and installation 12, but only one each is shown to avoid over-complicating the drawing. Remote site 14 may be any suitable remote site that may include equipment such as, for example, one or more servers, mainframes, personal computers, or any other suitable computer-based equipment. Remote site 14 may include a network of suitable computers that may be interconnected in any suitable way, such as, for example, through a local area network, wide area network, telephone network, cable television network, Intranet, Internet, or any other suitable wired or wireless communications network.

Communications network 16 may be any suitable communications network, such as, for example, a local area network, wide area network, telephone network, cable television network, Intranet, Internet, or any other suitable wired or wireless communications network. Some suitable wireless communications networks may be global system for mobile communications (GSM), time-division multiple access (TDMA), code-division multiple access (CDMA), Bluetooth, or any other suitable wireless communication networks. Installation 12 and remote site 14 may communicate over communications network 16 using any suitable protocol or protocol stack. For example, installation 12 and remote site 14 may communicate via a transmission control protocol/Internet protocol (TCP/IP) environment using, for example, IP version 4 or IP version 6 (that supports 128-bit network addressing) and a hypertext transfer protocol (HTTP). In another approach, universal plug and play (UPnP) technology may be used to allow communication between installation 12 and remote site 14. Any suitable request-response type of protocol and socket-based packet transport stack, or suitable peer-to-peer communications approach may be used as desired.

Installation 12 and remote site 14 may communicate using any suitable communications. Communications may include, for example, commands, requests, messages, remote procedure calls (e.g., using a proxy-stub pair), or any other suitable client-server or peer-to-peer communication. Communications may also involve, for example, complex communications between application constructs running on installation 12 and remote site 14. Objects running on the client and server may, for example, communicate using an Object Request Broker (ORB). Transmitted information may, for example, be encapsulated as COM objects or Javabeans and persisted to files that are transmitted over a remote access link. In another suitable approach, access communications may include hypertext markup language (HTML) formatted markup language documents (e.g., web pages), that are exchanged between installation 12 and remote site 14 via ISP 23 and communications link 16. For example, communications may consist of a series of HTTP posts and responses in which the parameters for the transmissions may be sent as name/value pairs in the normal post method. In order to achieve the result of transmitting multiple commands in a single command string, numbered commands may be parsed out and executed at remote site 14. Remote site 14 may be responsible for parsing the command string into individual commands and executing each of those commands. To parse the commands, remote site 14 may, for example, utilize a script language and interpreter such as Personal Home Page Tools (PHP) which is embedded within a Web page along with its Hypertext Markup Language (HTML). For example, before a page is sent to the requesting user, the Web server may call PHP to interpret and perform the operations called for. Other similar technologies may also be utilized such as JavaScript, Microsoft's VBScript, or any other applicable script interpreter. If desired, any other suitable client-server or peer-to-peer based approach may be used.

Installation 12 may be operated by a local user. Installation 12 may include one or more nodes. For purposes of illustration, FIG. 1 illustrates an approach having two nodes, first user node 18 and second user node 20. It should be understood that nodes 18 and 20 may be located at a single location, such as the user's main residence. If desired, nodes may be located across more than one location. For example, one node may be in a user's main residence and another at the user's vacation house. If desired, nodes of an installation may be associated with more than one user account.

In one embodiment of the present invention, user node 18 may include a client device 22 that may be connected to communications network 16. In Internet-based approaches, such as, for example, in the embodiment shown in FIG. 1, client device 22 may be connected to the Internet via an Internet service provider (ISP) 23. Client device 22 may be any device suitable for communicating with remote site 14 via communications network 16. For example, client device 22 may be a computer, a personal digital assistant (PDA), a terminal, a set-top box, or any other suitable device that provides access to remote site 14 via communications network 16. Client device 22 may include, for example, an Internet browser application 26 that may be used to access web pages via communications network 16. In other suitable approaches, client device 22 may run a client application that provides locally generated displays propagated with a format obtained using any suitable client-server or peer-to-peer scheme.

Client device 22 may communicate with ISP 23 or directly with communications network 16 using any suitable communications link. For example, the link may include a telephone dial-up link, digital subscriber line (DSL), a cable modem link (e.g., a data over cable service interface specification (DOCSIS) link), a satellite link, a computer network link (e.g., Ethernet link, T1 line, etc.) or any other suitable communications link or combination of communications links.

Remote site 14 may include one or more servers such as, for example, web server 46 and database server 48. Database server 48 may maintain database 58. In other suitable approaches, such as non-Internet based approaches, remote site 14 may include an application server and any other suitable server or combination of servers. As herein used, the term "server" is not limited to a distinct piece of computing hardware or storage hardware, but may also be a software application or a combination of hardware and software. For example, one computer may have software that enables the computer to act as both a web server and as a database server.

In some suitable approaches, remote site 14 may provide displays or display definitions to client device 22. In the Internet-based approach of FIG. 1, for example, web server 46 may generate static and dynamic web pages from data supplied by database server 48. Web page 47 may be viewed by a user using Internet browser 26 running on client device 22.

Software applications interfacing installation 12 with remote site 14 may be created using any suitable platform and/or software development tools. For example, Java 2 Enterprise Edition, Javabeans, component object model (COM) based technologies (e.g., ActiveX, object linking and embedding (OLE), etc.), Javascript, Visual Basic, C, C++, scripting languages, or any combination of these or other suitable development tools may be used in creating the software interface between installation 12 and remote site 14 (e.g., web-page interface). Any combination of these or other suitable development tools may be used in preparing any other software modules or applications for use in any other suitable facet of the present invention.

Remote site 14 may function as the master controller of the system shown in system 10. In addition, users may access the system shown in system 10 via any computer, monitoring module, or remote user access device linked to communications network 16. Remote user access devices (such as remote user access device 17 in FIG. 1) may include, for example, personal digital assistants, cellular telephones, set-top boxes, personal computers, or any other suitable device a user may use to access remote site 14 via communications network 14.

Monitoring modules 28 may serve as an interface between remote site 14 and at least one connected device 32. Monitoring modules 28 may be any suitable hardware, software, or a combination thereof and may be included at any point within the system. For example, monitoring module 28 may be a software application running on client device 22 or a separate piece of hardware that may be connected to client device 22 (as shown at node 18) or partially implemented as software on client device 22 and a separate piece of hardware. In some embodiments, monitoring module 28 may be a standalone appliance (as shown at node 20) connected to communications network 16, operating separately and independently from client device 22. Each monitoring module may be shipped with a model identification code, or with the capacity to generate such a code, that may serve to identify each particular monitoring module's model type.

One or more monitoring modules may be installed at one or more locations. Monitoring modules may be installed by the user (or any other suitable person) by, for example, connecting the modules to client device 22 that may communicate with remote site 14 over communications network 16. The connection between the monitoring module and the client access device and between devices and the monitoring module may be in the form of a universal serial bus (USB) connection, parallel port connection, serial connection (e.g., RS-232), Firewire connection, any combination of these, or any other suitable type of connection. If desired, monitoring modules may be given the capability (e.g., processing hardware, communications equipment, etc.) to communicate, via communications network 16, without the use of a client access device. Monitoring modules may link attached devices or appliances (e.g., sensors, cameras, microwaves, refrigerators, etc.) with remote site 14 via communications network 16. One or more monitoring modules 28 may provide data from attached devices and appliances to remote site 14 via communications network 16. The term "device," as defined herein, shall include any suitable device or appliance.

At least one device 32 may be interfaced with and controlled by each monitoring module 28. Connections between monitoring module 28 and the various devices 32 may be hardwired or wireless (e.g., using Bluetooth technology). Devices 32 may encompass any suitable device capable of being controlled or mediated by an external controller. Such devices may include, but are not limited to, a camera 34, a radio 36, a smoke or fire detector 38, a contact sensor 40, and a light switch 41. Although not illustrated, other suitable devices may include, for example, various audio input and output devices, infrared devices and sensors, various visual displays, washers/driers, microwave ovens, cooking ranges, car alarms, plant watering devices, sprinklers, thermostats, carbon monoxide sensors, humidity sensors, water emersion sensors, radon sensors, temperature sensors, audio sensors, radiation sensors, rain gauges, video cassette recorders, radio tuners, or any other suitable device and the like.

Monitoring modules may register themselves, devices, or installations with remote site 14. Illustrative systems and methods for auto-registering devices with remote sites are described, for example, in Rezvani et al. U.S. patent application Ser. No. 09/709,688, filed Nov. 10, 2000, which is hereby incorporated by reference herein in its entirety.

One or more notification devices, such as pager 43, may also be incorporated into the system. As illustrated in FIG. 1, pager 43 is in wireless communication with a wireless or cellular transmitter 44 associated with remote site 14. Other suitable notification devices include, for example, e-mail clients, wireless hand-held computers, wireless wearable computer units, automatic web notification via dynamic web content, telephone clients, voice mail clients, cellular telephones, instant messaging clients, and the like.

System 10 provides users with opportunities to remotely control and monitor devices 32 using remote user access devices 17 via communications network 16. In the example of FIG. 1, users may control devices 32 that are interfaced with monitoring modules 28 at node 18 and devices 32 interfaced with monitoring module 28 at node 20. In practice, there may be a single node, or more nodes, depending on, for example, the user's equipment, number of sites, or other suitable parameters. In practice, a suitable system architecture and communications network 16 may allow users, or anyone that users permit, to readily monitor and control monitoring modules 28 from any location using any suitable device that is capable of communicating with remote site 14 via communications network 16.

In another suitable approach, users may access installation 12 using remote user access devices 17 without the use of remote site 14. For example, remote user access devices 17 may be used to communicate with monitoring modules 28 of installation 12 via communication network 16 and ISP 23. If desired, two-way communications may be implemented using this approach. Remote user access device may access installation 12 using, for example, special IP addresses assigned to a particular monitoring module, node, installation, or any other suitable element of the installation. The use of IP addresses is merely illustrative. Any other suitable addressing may be used to allow access to an installation from a remote used access device.

Devices 32 may be programmed at the installation in terms of how they respond to certain events (e.g., what does the camera do when the contact sensor is triggered?). Alternatively, devices 32 may be programmed from a remote location using remote user access device 17, for example. The programming may be stored in devices 32, monitoring modules 28, or at remote site 14.

The following examples of the uses of illustrative devices will illustrate the operation of the present invention. For example, contact sensor 40 of FIG. 1 may be associated with the front door (not shown) of a remote location associated with second node 20. Contact sensor 40 may be configured to trip whenever the front door is opened. Camera 34 is also positioned to view the front door location and may be programmed to take a digital picture whenever the sensor contact 40 is tripped. This picture may be transmitted over communications network 16 and stored in database server 48. When contact sensor 40 detects that the front door has been opened, an event notification or alarm trigger may be transmitted by monitoring module 28 to database server 48. Database server 48 may have been previously programmed to transmit a notification event to the user's pager, for example, via cellular transmitter 44. As the contact sensor is tripped, camera 34 may take a picture of the front door and may transmit that picture, via monitoring module 28 and communications network 16, to database server 48. The user, having been notified via pager 42, may now access the picture using web server 46 of remote site 14 via Internet browser 26. In this way, the user may determine who has entered the front door of his or her home.

As another example, system 10 may allow a user located at one node 18 a remote site to control a device at a second node 20. The user may contact web server 46 via, for example, Internet browser 26 of node 18 in order to access a database entry for light switch 41 of node 20. A virtual representation of the light switch 41 may be made available to the user by web server 46 and may be manipulated by the user to remotely change the state of light switch 41 and the connected lamp 42. For example, the system may allow the user to change the state of lamp 42 from being "off" to being "on" by, for example, manipulating the virtual light switch from web server 46 and a corresponding command would be placed in the queue of waiting commands on the server component.

Periodically, the controlling module or monitor 28 may poll remote site 14 looking for waiting commands, such as the change state command of light switch 41. Thereafter, the command may be transmitted to monitoring module 28 that would instruct the light switch to change from the "off" state to the "on" state, thus turning on lamp 46. This change in state of lamp 46 may be viewed by an appropriately positioned camera, such as camera 34, which would be used to visually monitor the remote location 20 to determine whether the command had been completed successfully. If the command had not been successfully completed, then an error message may be communicated to the user, using for example, the means specified by the user's notification preferences or through any other suitable means of communicating information to the user.

Figure 2:
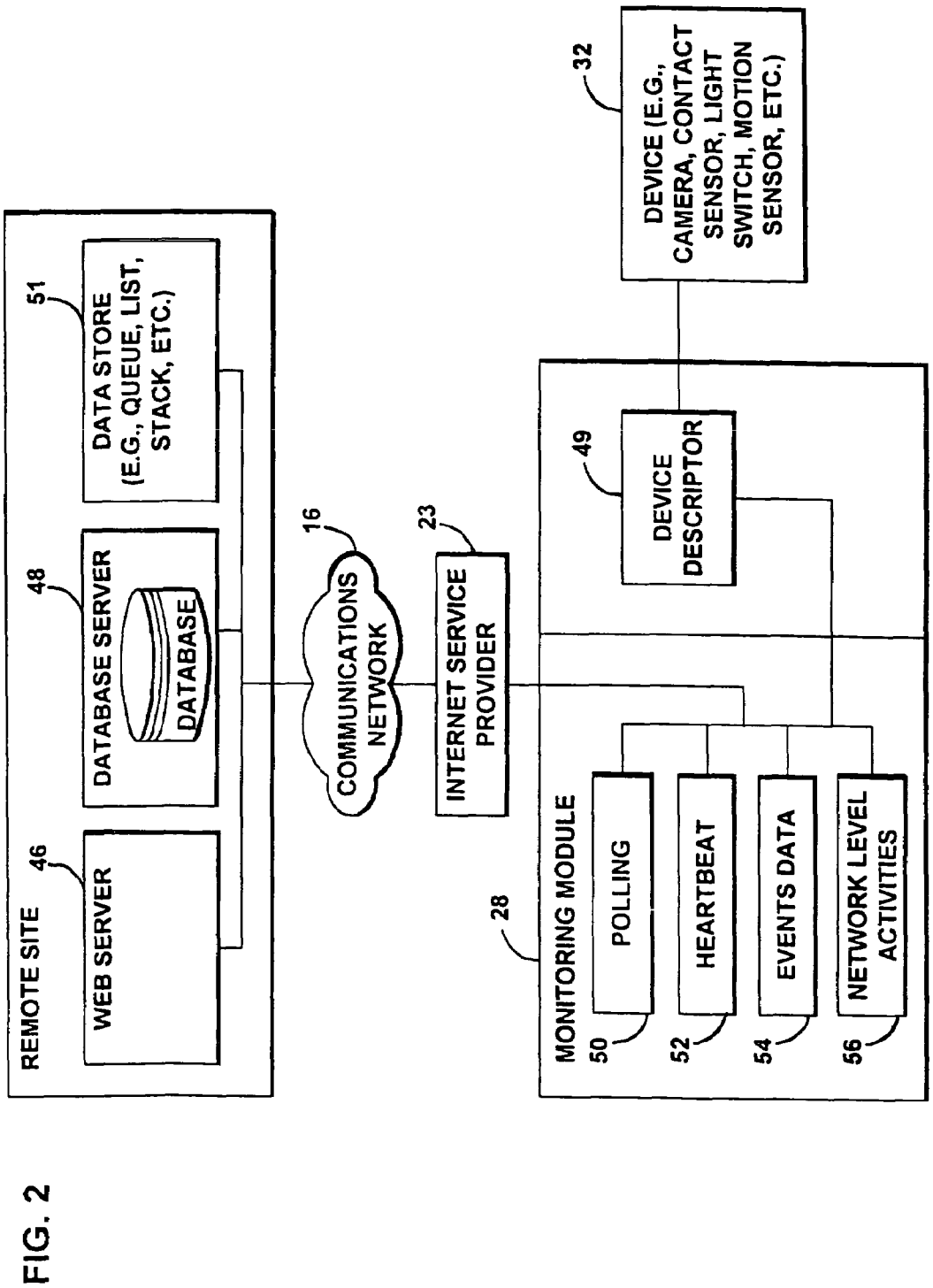
FIG. 2 is a schematic block diagram of the components of the illustrative upload system of FIG. 1 in accordance with an embodiment of the present invention.

Referring now to FIG. 2, monitoring module 28 may serve, for example, as a common connection point for one or more devices 32 at an installation 12 and as the interface between devices 32 and remote site 14 via communications network 16. Monitoring module 28 may, for example, serve as a translation and brokering agent between remote site 14 and devices 32.

In one suitable embodiment, monitoring module 28 may be software made up of multiple dynamically loaded objects, or device descriptors 49, that may allow remote site 14 to interface with the devices 32. The dynamically loaded device descriptors 49 may act as device drivers for devices 32, translating, in both directions, monitoring, command, and control data (i.e., via monitoring module 28) exchanged between devices 32 and remote site 14 via communications network 16. Each device descriptor 49 may also translate the signals received from monitoring module 28 into the specific electrical signals that are required to communicate with (both input and output) and control its associated device 32. Device descriptor 49 may be provided for each specific device 32 when, for example, different devices 32 have different interfaces and require specific sets of electrical signals for their monitor and control.

Device descriptors 49 may include, for example, a manufacturer identification, product identification, and driver version number to allow a device to be referenced correctly. Once a new device 32 has been detected and is to be integrated into the system, monitoring module 28 may reference, download, and run the appropriate drivers for the new device.

After loading a new descriptor 49, monitoring module 28 may communicate with remote site 14 to determine whether the new device 32 has been previously catalogued. Monitoring module 28 may, for example, determine if a general description and a default state of device 32 exists at the remote site. When a device 32 has been catalogued then, for example, the default state and general parameters of device 32 may be stored at remote site 14. A catalogued device 32 may eliminate the need to resend the general parameters and default state and monitoring module 28 may just communicate the instance-specific parameters. When a device 32 is not already catalogued, monitoring module 28 may communicate its default state and static parameters directly to remote site 14. The communication from monitoring module 28 to remote site 14 may be done using name/value pairs using, for example, the normal HTTP post method discussed hereinbefore. For example, a template document may be a static parameter of device 32.

A template is a layout document which can specify how components, actions, and indicators are to be laid out on the user's end display (e.g., user's web page 47 at remote site 14). The template may exist anywhere on the system as either a static or dynamic parameter. For example, templates incorporating static parameters may exist as a static parameter inside the hardware of device 32, as a static parameter within the driver and setup during registration procedures, may be hard-coded into a remote server, or may be communicated through monitoring module 28 via the device drivers and stored on the user's account. Any other suitable approach may be used.

Templates utilizing dynamic parameters may, for example, allow updates to be sent to the template while the driver and device are in an execution state. Furthermore, when incorporating dynamic parameters, templates may be downloaded from a remote location (e.g., from the manufacturer's server). The ability to download templates from the device manufacturer may permit the manufacturer to incorporate desired changes and/or new aspects in the device template.

Figure 3:
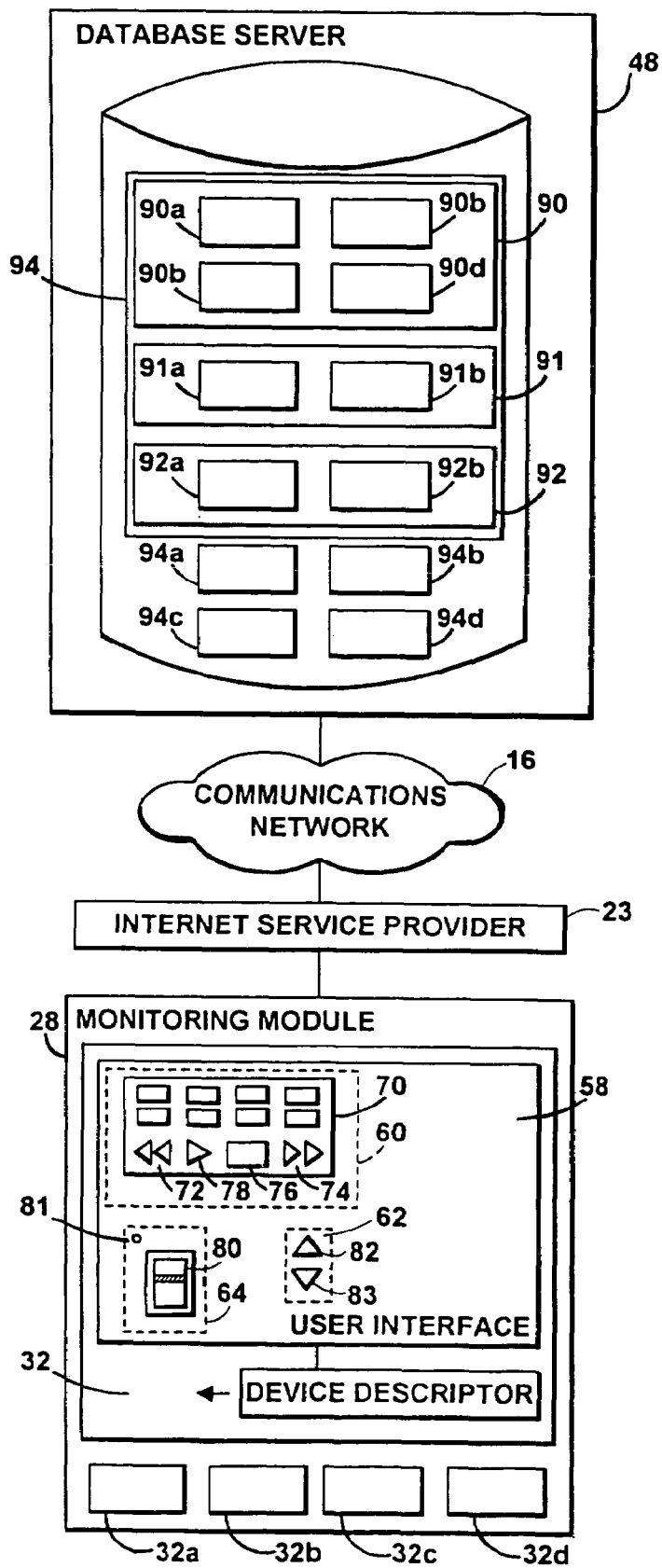
FIG. 3 is a schematic block diagram of the components of the illustrative upload system of FIG. 1 in accordance with an embodiment of the present invention.

FIG. 3 further illustrates the relationship between devices, monitoring modules, and remote database server 48. FIG. 3 shows five devices, 32, 32a, 32b, 32c, 32d. In practice, there may be more or fewer devices within each installation. Each device may be interfaced to a monitoring module 28 via a device descriptor or driver 49 (only one shown). Each device may include a customizable user interface 58 that may be viewable on remote user access device 17 over communications network 16. Interfaces 58 may include virtual representations of the actual user interfaces of the devices.

In some embodiments, virtual representations may be stored on, for example, web server 46. Remote site 14 may use changes in device states to change the virtual representations of the devices with which the changed states are associated. A virtual representation of a device, as previously described, may be either a text-based, symbol-based, or image-based representation of an actual device 32 from the installation as it appears to a user who accesses the remote site from a location remote to the installation using any suitable remote user access device. For example, if the device is a light switch, the corresponding virtual representation may be an indicator icon that may be either green or red. If the indicator icon is green, that may denote that the actual light switch is in the "on" position. If the indicator is red, that may denote that the light switch is in the "off" position. If, during a heartbeat operation, remote site 14 is informed that the state of the light switch changes from "on" to "off," then the virtual representation of the light switch may change from being green to being red.

User interface 58 may include at least one resource. In the example of FIG. 3, resources 60, 62, and 64 are shown. Resources may provide users with access to features specific to their associated device. For example, the device shown in FIG. 3 represents a videocassette recorder (VCR) having a recording setting resource 60, a channel selecting resource 62, and a power selecting resource 64. Typical VCRs may have other operational resources, but the resources illustrated in FIG. 3 are sufficient to illustrate the operation of the device.

Each resource 60, 62, 64 may include one or more display components. For example, the recording setting resource 60 includes a display component 70 and a series of pushbuttons 72, 74, 76, 78 which a user may use to activate the VCR's reverse, fast forward, stop, and play functions, respectively. The channel selecting resource 62 may include a pair of pushbuttons 82 and 83 that users may use, respectively, to activate up channel and down channel functions of the VCR. The power selecting resource 64 may include a toggle switch 80 that users may use to activate the VCR's power on and power off commands, and an LED indicator 81 that may indicate the power condition of the VCR.

Other suitable display components may include toggle buttons, radio buttons, absolute sliders, proportional sliders, edit fields, labels, images, video clips, streaming video, streaming audio, multiselect list, time fields, date fields, or any other suitable display components. Display components may act as status indicators. If desired, display components allow users to toggle settings or otherwise manipulate devices 32. For example toggle buttons may serve as indicators, showing, for example, whether a device is in the "on" position or in the "off" position. Toggle buttons may allow users to change the state of a device, by, for example, turning a device on or off. Sliders may act as indicators by showing, for example, the percentage complete of a particular process a device may be performing (e.g., baking a cake), and may allow users to change the state of a device (e.g., changing the thermostat temperature). Edit fields may allow users to change textual representations of suitable elements (e.g., naming a television show to be recorded by the show's name). Video, audio, images, or any other suitable media-based components may act as indicators showing what the devices are sensing (e.g., images may be sensed by cameras, streaming video may be sensed by camcorders, audio clips may be sensed by audio recorders, etc.). Date and time fields may act as indicators, by, for example, displaying what date and time a VCR is set to start recording. Date and time fields may allow users to set the date and time a VCR may start recording. Multiselect lists may act as indicators by, for example, listing all sound sensors that are detecting noise in the house. Multiselect lists may also be used, for example, to select some of a number of available sensors to turn on.

A virtual representation of each device 32, 32a, 32b, 32c, 32d may be stored as a record 94, 94a, 94b, 94c, 94d in the database of database server 48 of remote site 14. Each record may contain an entry for each resource and its associated components which make up the device. For example, record 94 for VCR device 32 may contain an entry 90, 91, 92 for each resource 60, 62, and 64, respectively, and an entry 90a, 90b, 90c, 90d, 91a, 91b, 92a, and 92b for each component 72, 74, 76, 78, 82, 83, 80, and 81, respectively. In addition, a web page 47 may be generated by web server 46 by extracting the associated record for that device from database server 48 and creating a graphical, textual, tactile, aural, or other suitable user interface representation of that device that the user may access via, for example, Internet browser 26.

One of the functions that monitoring module 28 may serve is to persist the state of devices 32. This may be done, for example, to allow the real-time states of devices 32 to be stored, to communicate to remote site 14, or to allow for easy recovery from a system crash.

The stored state of devices 32 may also be used for maintaining a synchronized relationship between an installation 12 and remote site 14. In some embodiments of the present invention, remote site 14 and installation 12 may use polling and heartbeat mechanisms in order to synchronize state information between remote site 14 and installation 12. Polling may refer to a process whereby monitoring module 28 obtains commands from remote site 14. The commands may reside, for example, in command queue 51. Commands may be accumulated at command queue 51 as a result of any suitable action by the user, by remote site 14, or by both. For example, a user may use a remote user access device to issue a command or a request to remote site 14 to cause a change in state of one of devices 32 (e.g., to turn a lamp on). Remote site 14 may post the change in state command to a command queue 51.

Monitoring module 28 may communicate a request for pending commands to remote site 14. This request may be communicated periodically as part of the polling process. In response to the monitoring module's request, remote site 14 may provide one or more pending commands from command queue 51, and may notify monitoring module 28 of the number of remaining pending commands in command queue 51. Monitoring module 28 may then again communicate a request for pending commands. Remote site 14 may return more of the pending commands from command queue 51. This process may continue until command queue 51 at remote site 14 is empty.

Remote site 14 may provide commands to monitoring module 28 using any suitable algorithm. For example, remote site 14 may return commands using first-come, first-serve, round robin, first-in, first-out, weighted prioritization, or any other suitable algorithm. Remote site 14 may also proactively inform monitoring module 28 that commands are waiting in queue 51. Monitoring module 28 may then poll remote site 14 and retrieve commands from remote site 14 until the queue is empty.

Commands issued on remote site 14 can be generated by the user while the user is logged on to web page 47 provided by remote site 14. If a user is not logged onto web page 47 then fewer commands are being issued and thus the need to poll remote site 14 is low. Therefore, the frequency of polls may decrease. In addition, a poll frequency setting process may monitor the usage patterns of a user and make anticipatory guesses based on the user's pattern of command generation. For instance, the user may not often be logged on to web page 47 at remote site 14 from the hours of 2 AM to 7 AM because the user is sleeping. Therefore, the smart frequency setting process may notice this pattern and automatically decrease the poll frequency at 2 AM and increase it again at 7 AM.

Whereas polling process 50 is used by remote site 14 to effect state changes in devices 32 via monitoring module 28, monitoring module 28 may use heartbeat process 52 to update device state information at remote site 14. A heartbeat may be a periodic communication from monitoring module 28 to remote site 14 containing updated state information for devices 32 associated with monitoring module 28. In one suitable heartbeat process 52, monitoring module 28 may send a communication to remote site 14 in response to a change in state of a device 32, a synchronization of a device 32 with remote site 14, a triggered alert event, or in response to any other suitable event. In such a heartbeat operation 52, all data intended to be transmitted to remote site 14 may be transmitted to remote site 14 via communications network 16. Remote site 14 may transmit an acknowledgment of receipt and successful processing of the data back to monitoring module 28.

Remote site 14 may direct monitoring module 28 to make changes in its own state by, for example, posting commands to data store 51. For example, remote site 14 may post commands that set or modify the polling 50 or heartbeat 52 time intervals. Upon reaching the end of the current polling interval, monitoring module 28 may send a communication to remote site 14 requesting any queued commands. Monitoring module 28 may continue to poll, using a preselected communication scheme, until the queue of commands waiting for monitoring module 28 is empty. Each command received from the queue may be acted upon when the command is received and any associated state changes are effected. Remote site 14 may transmit an acknowledgment of receipt and successful processing of the data back to monitoring module 28.

If desired, remote site 14 may send unsolicited communications to monitoring module 28. Remote site 14 may send communications to, for example, set or update the heartbeat or polling time, or to cause monitoring module 28 to issue a command to update a component of a device. Remote site 14 may send unsolicited communications to monitoring module 28 for any other suitable purpose.

In addition to maintaining the polling and heartbeat operations and exchanging communications for events, data, and commands 54 with remote site 14, monitoring module 28 may also take care of many network level activities 56. These activities may include, but are not limited to, verifying passwords, dialing up an ISP, if necessary, periodically uploading accounting/billing information, and performing security measures. Any other suitable network level activities may be performed by monitoring module 28.

Users may be provided with opportunities to access content published on remote site 14. The published content may have been captured by one or more devices 32. Monitoring modules 28 may obtain content from devices 32. Devices 32 may capture content in accordance with user commands (e.g., user commands generated by a user using client access device 22 or remote access device 17), or may be triggered to capture content in response to events detected by other devices in an installation. In another suitable approach, devices 32 may capture content continuously or periodically.

In some embodiments of the present invention, uploaded content may be published and associated with a particular user account, thereby establishing an affinity between the user and the user's installation 12, monitoring module 28, or device 32. If desired, the content may be made available to only a user or users associated with the content. In one approach, one or more users may be associated with device 32. Content captured by device 32 may be published to multiple user accounts. A user associated with device 32 may setup, or restrict, to whom content captured by device 32 may be published. In some embodiments of the present invention, content may be captured and uploaded to remote site 14 without using persistent storage in client device 22. For example, content may be captured by a device 32, directly uploaded by client device 22, via monitoring module 28, to remote site 14, published using a web page script, and then stored for user access. In some embodiments, content may also be persistently stored as a back up if, for example, the upload transmission of content by client device 22 fails. In other embodiments, content may be stored persistently and then transmitted.

Content may be wrapped with metadata that instructs the remote site how and what to do with the captured content. The metadata may include an indication of a user, the device 32 that captured the data, an associated monitoring module 28, or any other aspect of an installation. The remote site 14 may associate the captured content with the user or the user's account based on the metadata.

Sensor device 32 such as smoke sensor 33, contact sensor 40, motion sensor, or other suitable sensor devices 32 may detect environmental occurrences or changes, sometimes referred to herein as "events", and trigger capture devices 32 to capture content. Monitoring module 28 may receive the content from the device 32 and upload the content to remote site 14.

Device 32 may capture content continuously with a user defined frequency, over a user defined period, or at a scheduled time. For example, a scheduled time may be set through client device 22 or remote site 14 using remote access device 17. The user may initiate an upload of captured content by instructing device 32, through monitoring module software 28, to upload a captured image. For example, client device 22 may provide the user with a "home control" application in which the user may initiate the capture of an image by selecting a specific device and selecting applicable capture options on the application (this concept will be illustrated in FIG. 12). Any other suitable approach may also be used.

Client device 22, running monitoring module software 28, may receive captured content and encapsulate it into one or more data objects to upload to remote site 14. Initially, the object may be temporarily placed in the local random access memory (RAM) of client device 22. A socket may be opened from client device 22. The object, or collected content, is copied across the socket to database server 48 at remote site 14. In one suitable approach, the object may be persisted to a stream, transmitted, and reinstantiated at remote site 14. Upon database server 48 receiving data, database server 48 may signal web server 46 to process and publish the captured event to web page 47.

Monitoring module 28 may use any suitable communications protocol or group of protocols to communicate with remote site 14. The protocol may include for example, series of HTTP posts and responses in which the parameters for the transmissions may be sent as name/value pairs in the normal HTTP post method. Multiple commands may be transmitted using a single command string in which commands are numbered. Commands may be parsed from the string and executed at remote site 14.

FIGS. 4a, 4b and 5-8 are flowcharts of illustrative steps involved in some embodiments of the present invention. The steps shown in FIGS. 4a, 4b and 5-8 are only illustrative and may be performed in any suitable order. In practice, steps may be added or deleted.

Figure 4A:
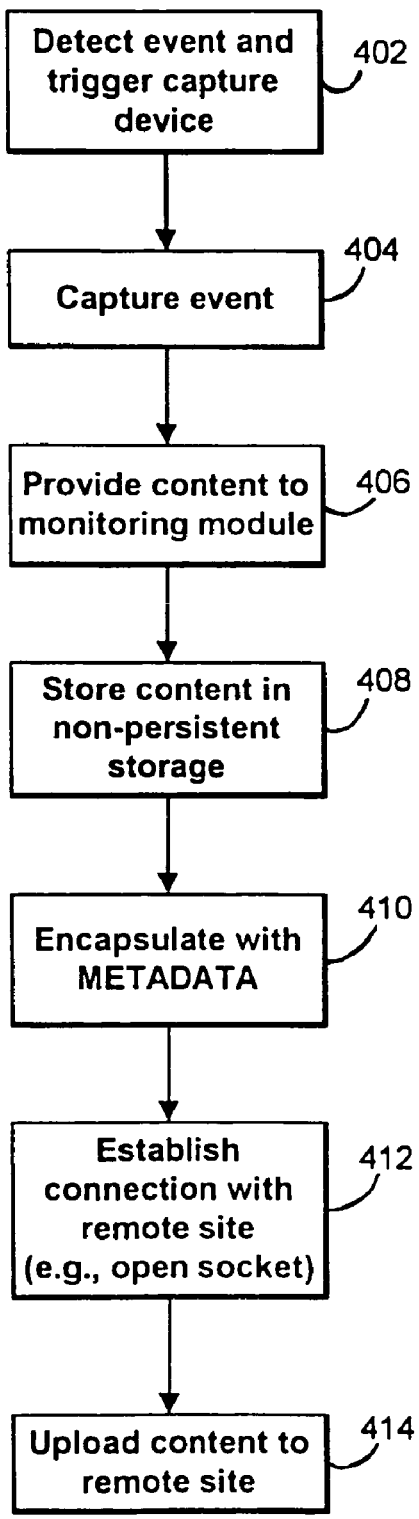
FIGS. 4a and 4b are flowcharts of illustrative steps involved in capturing, uploading, and publishing event data in accordance with an embodiment of the present invention.
Figure 4B:
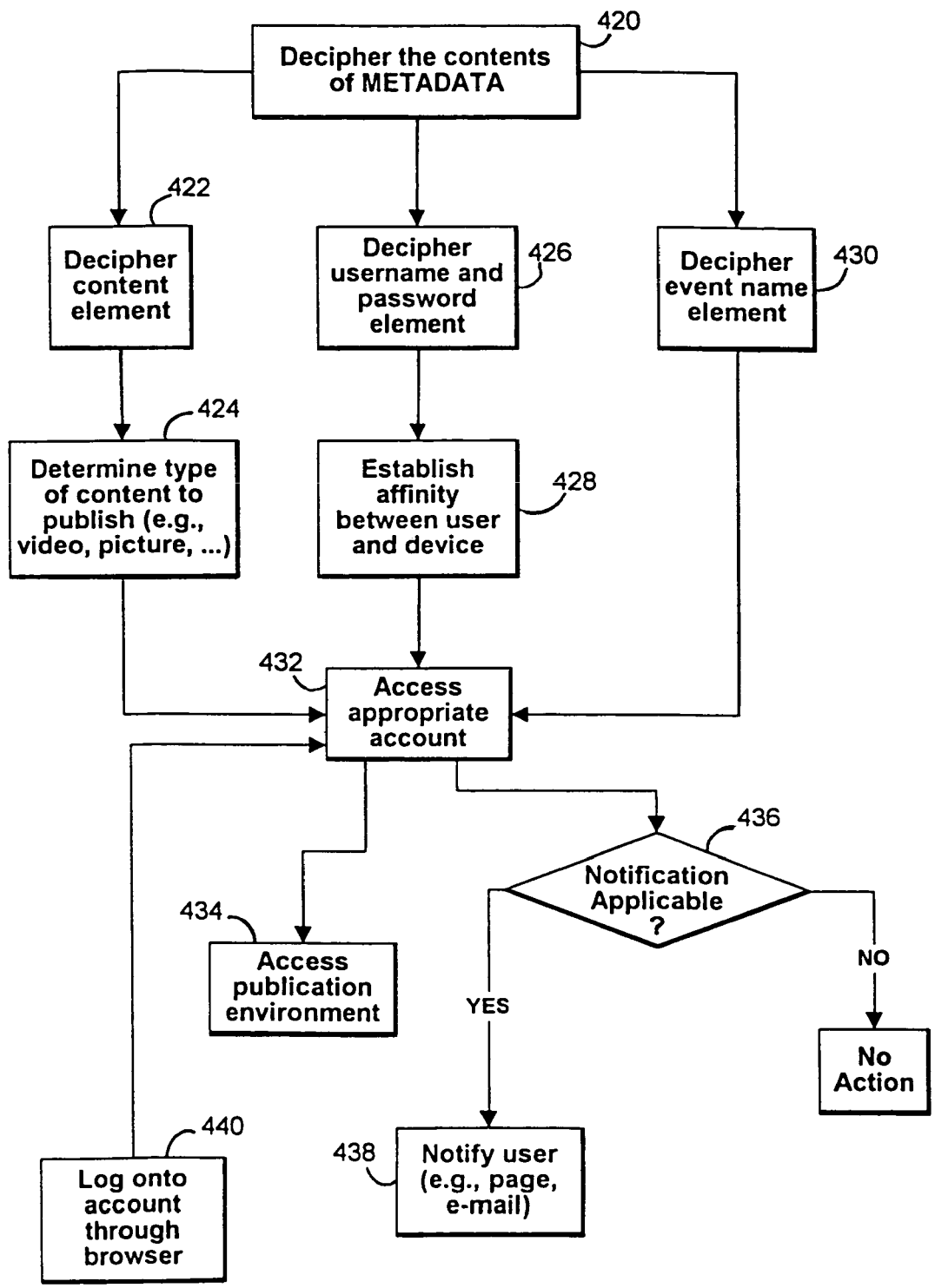

FIGS. 4a and 4b are flowcharts of illustrative steps involved in capturing, uploading, and publishing content in accordance with one embodiment of the present invention. The steps shown in FIGS. 4a and 4b are only illustrative and may be performed in any suitable order. In particular, suitable steps may be deleted and other suitable steps may be added. At step 402 a sensor device detects an event and triggers a capturing device. The triggered device captures content at step 404 to provide the content to monitoring module 28 at step 406. At step 408, monitoring module 28 stores the content in non-persistent storage such as random access memory (RAM) of client device 22 or monitoring module 28 until a connection is established with remote site 14. At step 410, the temporarily stored content is encapsulated with relevant metadata. Monitoring module 28 then opens a socket, at step 412, to establish a connection with remote site 14 and uploads the captured content to remote site 14, at step 414.

Turning to FIG. 4b, the content may be deciphered at step 420. Deciphering content may include, for example, unwrapping metadata that encapsulates the content. As used herein, metadata is structured data which describes the characteristics of the captured content being transferred ("data about data"). Metadata may allow remote site 14 to determine the type of content being uploaded. For example, remote site 14 may examine the metadata to determine the user, device 32, monitoring module 28, or other elements of the installation associated with the content. The metadata may also be examined, for example, to determine the type of captured content, capturing device, or appropriate virtual interface.

Content wrapped with metadata may instruct the remote site on how the wrapped content may be handled or published. Metadata may also include or be supplemented by other data related to the content. For example, the metadata may identify a user, monitoring module 28, capturing device 32, or other components of the installation 12 in which the content was captured. This identification may establish the affinity between a particular user account and registered device 32 that captured the content, thereby associating captured content with a user account and providing a basis for executing publication schemes.

Metadata may include element names and elements. Elements may describe the contents, location, physical attributes, type (e.g., text, image, video, temperature, etc.), form (e.g., a document, electronic mail, etc.), or other attributes of the captured content. Metadata elements may include, for example, usernames, identifications (ID) of sender, passwords, device identities, event names (what caused a device to be triggered), dates and times, and any other suitable data (e.g., data describing content, an associated user, event, or component of an installation).

All or portions of the metadata may be posted to a designated web page 47 at the remote site 14. Remote site 14 may run a script and interpreter such as Personal Home Page Tools (PHP), which may be embedded into the Hypertext Markup Language (HTML) code of a web page, that processes data for publishing. The script may store the data at remote site 14 so that it may be accessed through web page 47. For example, content may be processed by first validating the username and password associated with a user account and the registered devices. Upon validation, the captured content may be published to (e.g., stored on web server 46 for publication in a web page) the user's account. When the user accesses his or her account, the content may be provided in a display such as a web page. In some embodiments, the metadata may indicate a notification action that is to be performed when the content is published.

FIG. 4b shows these illustrative metadata elements—identification, content, and event name—which may be translated and executed. More elements may be incorporated within the metadata, but only three elements are shown to avoid overcomplicating the example.

Before content is published on web page 47 in step 414, an association may be made between the registered user and registered device (the unique affinity present between the user and device). At step 426, a user identification and password element may be deciphered. The affinity between the user and the capturing device 32 is established at step 428. Once verified, an association may be made between the captured event data from device 32 and the user, thus accessing the appropriate account 432 and publishing within the applicable publication environment 434.

A content element may be deciphered at step 422. The element may include a description of the type of content, its format, or the information about the content. For example, the deciphered content element may indicate that the content is electronic mail, a plain-text message, video feed, picture media, or any other applicable content in step 424. The content may be associated with the user determined at step 428 so that the user may access the content through the user's account. At step 432 and 440 the user logs on and accesses his or her user account at step 434 accesses the deciphered content in a publication environment (e.g., web page).

Metadata event may include, for example, an event name as shown at step 430. The event name may be deciphered and assigned to a captured event, and assigned an event notification instruction. Some embodiments may determine if notifications are applicable for a particular captured event based on the event name. The appropriate user account may be accessed (step 432) and a reference check may be made within a notifications field to determine if there is a notification associated with the event (step 436). If a notification is associated with the event occurrence captured, the user may be notified in step 438 via e-mail, paging, or any other suitable approach. If no notifications apply to the event then no action is executed.

Users may be provided with the ability to remotely monitor and control networked devices 32 via monitoring modules 28. Returning to FIG. 1, users may monitor and control devices 32 via remote site 14 using remote user access device 17, or directly using client access device 22. In some embodiments, users may monitor and control devices 32 via a remote site using client access device 22 and browser 26. Client access device 22, remote user access device 17, or web server 46 may construct a suitable user interface for allowing users to monitor and control devices 32 using any suitable approach. Some embodiments may use one or more templates that layout the look and position of the members of a device 32 (i.e., the features of device 32 accessed or used by a user, such as, for example, controls or displays).

Members of device 32 may be defined as physical controls on device 32 such as, for example, a power push-button on a VCR. Device members may correspond to any suitable controls, displays, or combination of like components made available by the virtual interface for device 32.

Components may also correspond to functional elements of device 32. For example, there may not be a button to program a program recording in a VCR of a regularly scheduled media but that functionality may be represented in the virtual interface. Furthermore, components that represent device 32 may be incorporated to correspond to pieces of functionality that may not exist on the device. A button represented on the user interface through web page 47 that "locks" down a VCR, for example, may not correspond to a physical button on the VCR. The unavailable functionality on the VCR may allow the user to remotely access his or her VCR to lock it for the purpose of protection. Such a component may be created in, for example, the device driver in monitoring software 28.

The templates may reference components that define how the members of devices 32 are presented to and controlled by users. For example, components may be objects that include methods and data suitable for presenting the members to users. Upon receiving a request or other indication from remote user access device 17 or client access device 22 that a user wishes to monitor or control a device 32, database server 48 or client access device 22 may acquire one or more of these templates and components using any suitable approach. For example, database server 48 or client device 22 may retrieve templates and components from its own storage or from another database server (e.g., from the Internet), using URLs or other identifiers of the templates or components. In some embodiments, devices 32 may be programmed with the templates and may provide them to client access device 22 or database server 48.

The template may include place holders for components. Components, which may correspond to device members, can be cut and pasted into the template. For example, a push button may be generated on the user interface from the current state of a toggle component in database 58. The push button component may be wrapped with javascript functions to be cut and pasted into the template. When a browser loads the interface (i.e., a template that has its place holders occupied by components), the push button may show up as a push button on the screen and clicking on it has the intended effects associated with the push button (e.g., turning a device on or off).

Web server 46 may take the template, locate components designated to device 32 using the components' IDs, and ask the components to generate a suitable user interface representation. Web server 46 may then take the suitable representation and paste it into the template corresponding to the components' IDs. The filled template may be used by web server 46 to generate a web page 47 suitable for allowing the user to monitor and control a given device. The filled template may include resource and component information that represents the state of a represented device 32. This information may be provided by monitoring module 28 for propagation into the user interface. For example, the state of a light switch, volume of a speaker, or that actual video from a video camera may be provided by monitoring module 28 to client access device 22 or remote site 14 and indicated in web page 47. The user interface may include interactive elements, such as sliders, buttons, etc., that allow the user to control a represented device 32. When the user changes the state of a device 32, the state change may be packaged as a command or other communication. The command may be entered into queue 51. In some embodiments, queue 51 may be an advanced queue that operates as specialized memory. A separate dequeue process may manage retrieving commands from the advanced queue in a non-first-in-first-out (non-FIFO) process for different devices, but in a FIFO process for commands for the same device. In some embodiments, multiple queues may be used for different devices, different users, or using any other suitable approach. Web page 47 (or other display) may indicate to the user that a state change has been submitted and in the process of being executed.

In some embodiments, database server 48 may not be updated immediately to reflect a change in state for a device made by a user. Instead, monitoring module 28 may receive packaged commands from queue 51 and provide the commands to the appropriate device descriptor 49. Device descriptor 49, as instantiated or otherwise activated by monitoring module 28, may issue a command to database server 48 to update the state of the device. If desired, this separate transmission may be the acknowledgment by monitoring module 28 that a state change was made.

Figure 5:
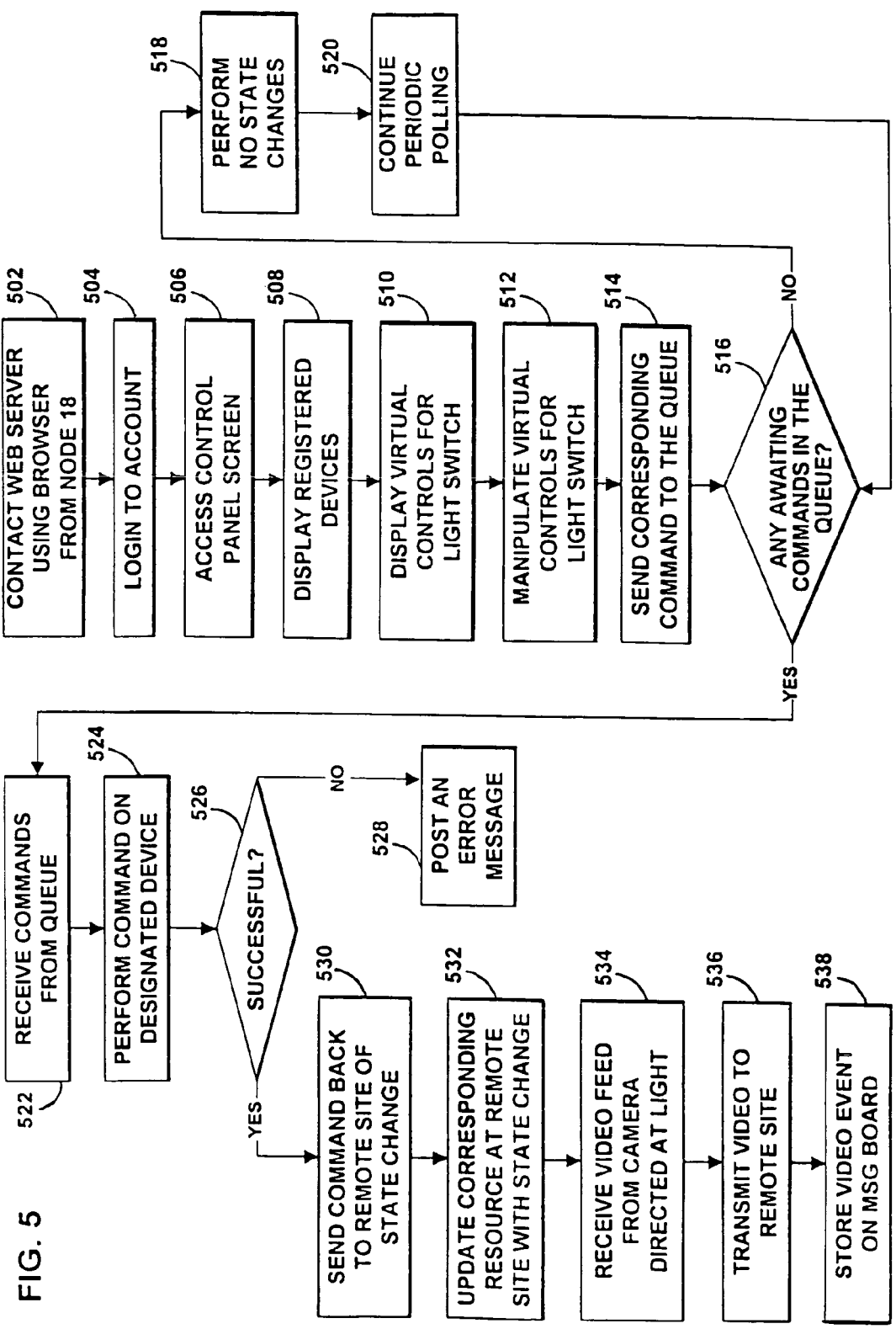
FIG. 5 is a flowchart of illustrative steps involved in executing commands to registered devices from a remote location in accordance with an embodiment of the present invention.

FIG. 5 is a flowchart of illustrative steps involved in allowing users to remotely monitor and control devices in accordance with an embodiment of the present invention. In this example, the user controls a light switch and watches content automatically captured and published by a video camera. At step 502, the user contacts web server 46 using Internet browser 26 or remote access device 17. At step 504, the user may be prompted to verify his or her registration with the system by, for example, entering a user name and password. Once logged in to his or her account, the user may access a control panel display to control the light switch (or other devices) (steps 506 and 508). The control panel display may include listings for the devices 32 associated with the user. A user may indicate a desire to control the light switch (e.g., by selecting a listing for the light switch in the control panel display). In response, a virtual representation of the light switch 41, generated from the template and components for the light switch 41, may be provided to the user (step 510). The user may manipulate the virtual representation of the light switch (i.e., the display components) to command the user's desired option (e.g., on or off) and remotely change the state of light switch 41 and connected lamp 42 (step 512). For example, the system may allow the user to change the state of lamp 42 from being "off" to being "on" by manipulating the virtual on/off switch from web server 46. In some embodiments, a command for the state change may be placed in queue 51 at step 514.

Monitoring module 28 may periodically poll remote site 14 to obtain waiting commands such as the state change command of light switch 41 (step 516). If there are no commands for monitoring module 28, it will perform no state changes and continue to periodically poll remote site 14 (steps 518 and 520). Otherwise, monitoring module 28 may retrieve or otherwise receive its commands from queue 51 (step 522). Monitoring module 28 may communicate the command to the device 32—in this example changing the state of light switch from off to on and thereby turning on lamp 44 (step 524). Monitoring module 28 determines whether the command is executed successfully at step 526. If not, monitoring module 28 posts an error message to remote site 14 and remote site 14 may generate a notification in accordance with the user's notification preferences or through any other suitable approach for communicating information to the user (step 528).

If the command is executed successfully, an acknowledgment may be sent to remote site 14 (step 530) and the state of the device updated in database 48 (step 532) and indicated to the user on the control panel. The successful execution of a command may have other effects. For purposes of illustration, assume that turning on lamp 44 triggers camera 34, which previously recorded nothing in the dark, to record and transmit video (step 534). The newly captured content (i.e. video) may be uploaded to remote site 14 (step 536) and stored for access by the user associated with the device. The video may be posted to a message board on the user's account (step 538).

Figure 6:
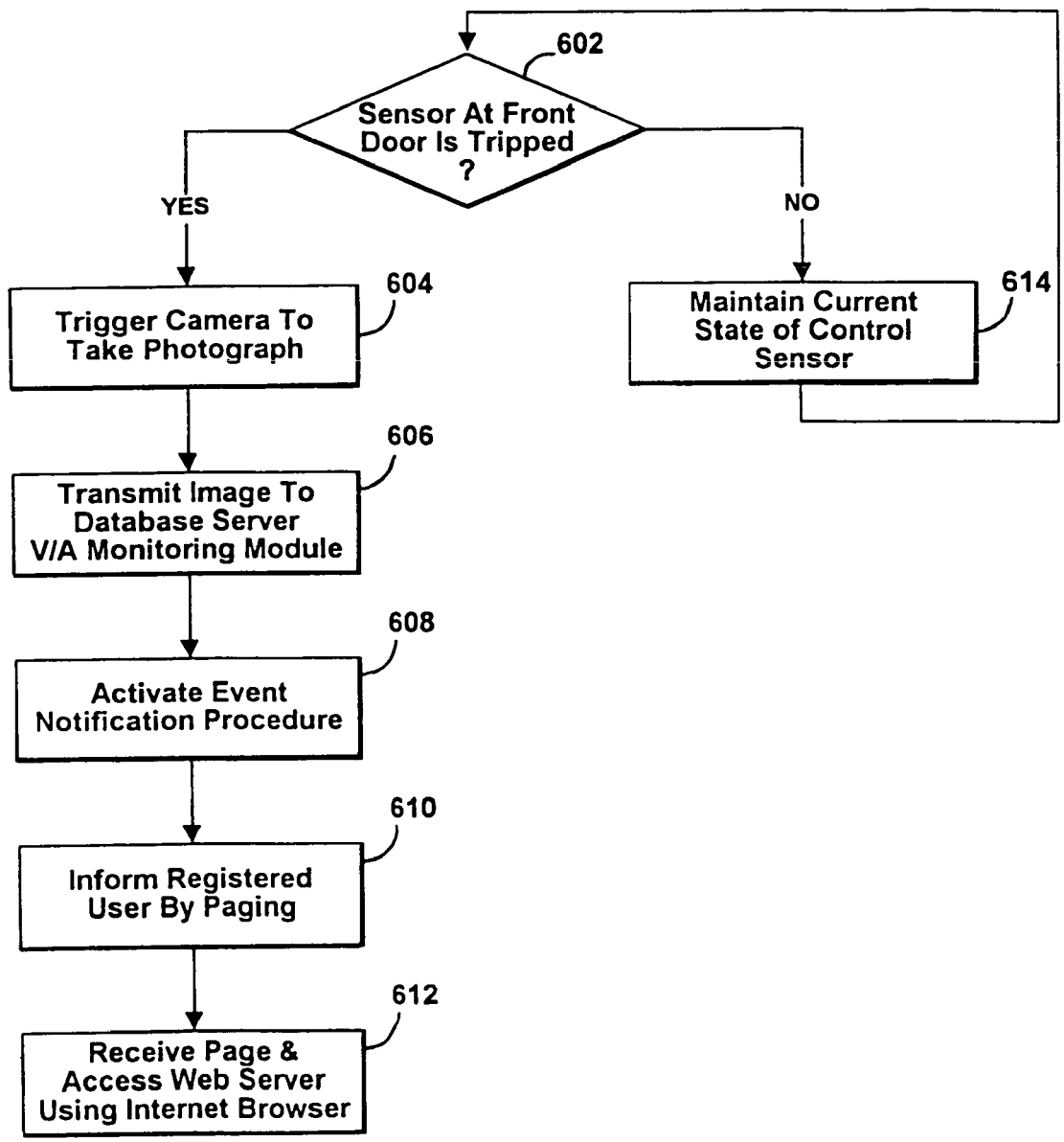
FIG. 6 is a flow chart of illustrative steps involved in the automatic upload of automatically captured content in accordance with an embodiment of the present invention.

FIG. 6 is a flowchart of illustrative steps involved in the automatic upload of automatically captured content. As an example, contact sensor 40 may be positioned so as to be linked with the front door and configured to trigger whenever the front door is opened. In addition to sensor 40, camera 34 may be positioned to view the front door location and may be programmed to capture a digital photograph upon contact sensor 40 being triggered. At step 602, contact sensor 40 may be monitoring for any triggering activity at the front door. When contact sensor 40 is triggered, for example by the opening of the front door, camera 34 may be instructed to take a digital photograph of the triggering event in step 604. The image content may then be transmitted, in step 606, over communications network 16, via monitoring module 28, and stored in database server 48, located at remote location 14, awaiting publication instructions. The triggering event may be linked with a notification. Once the uploaded content is deciphered a notification procedure may be activated and the user may be informed, in addition to the publication on his or her account, of the event occurrence (steps 608 and 610). The registered user may be informed of an event through pager 43, via cellular transmitter 44. In step 612, the user receiving a notification may access his account to acquire additional information concerning the triggering event. If sensor 40 has not been triggered then sensor 40 maintains its current monitoring state (step 614).

Figure 7:
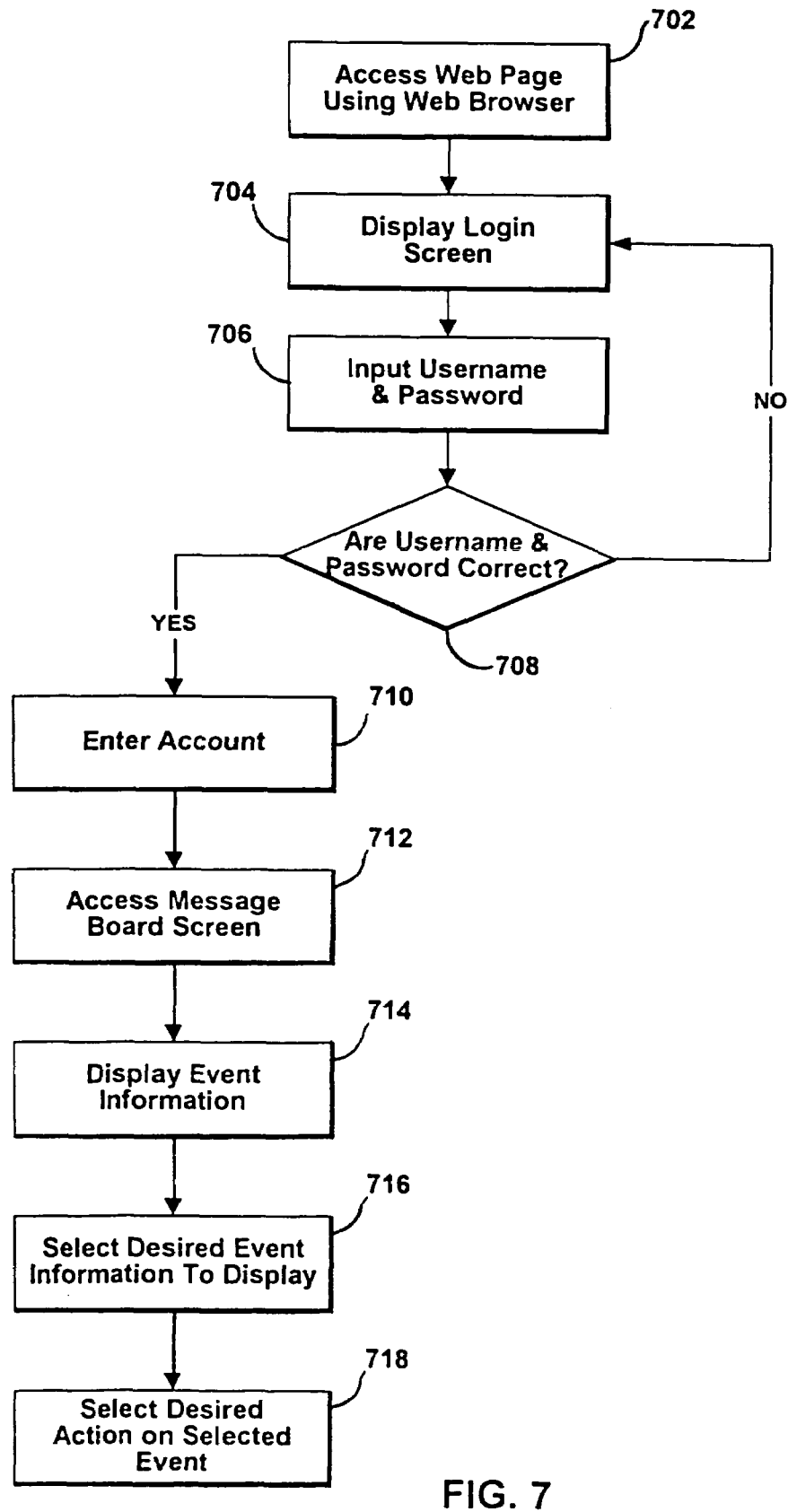
FIG. 7 is a flowchart of illustrative steps involved in allowing users to access content published to a user account in accordance with an embodiment of the present invention.

FIG. 7 is a more generalized flowchart of steps involved in allowing users to access content published to a user account. At step 702, the user accesses a web page using a web browser. The page may be a login page, or a home page after which a login page is displayed (step 704), and the user logs in by entering his or her user name and password (step 706). If the user name and password are incorrect, the login procedure restarts (step 708). Otherwise, the user enters his or her account (step 710) and may be presented a message board display if there are waiting messages or other notifications (step 712). An illustrative message board display is shown in, for example, FIG. 12. The messages may include event information, such as event names, that indicate to the user what events have occurred that caused the publication of new content (step 714). The user may select a desired event to access the content captured for that event, or additional information associated with the event (step 716). The user may also delete the event, relocate the event to another area of his or her account, or perform any other suitable action (step 718).

Figure 8:
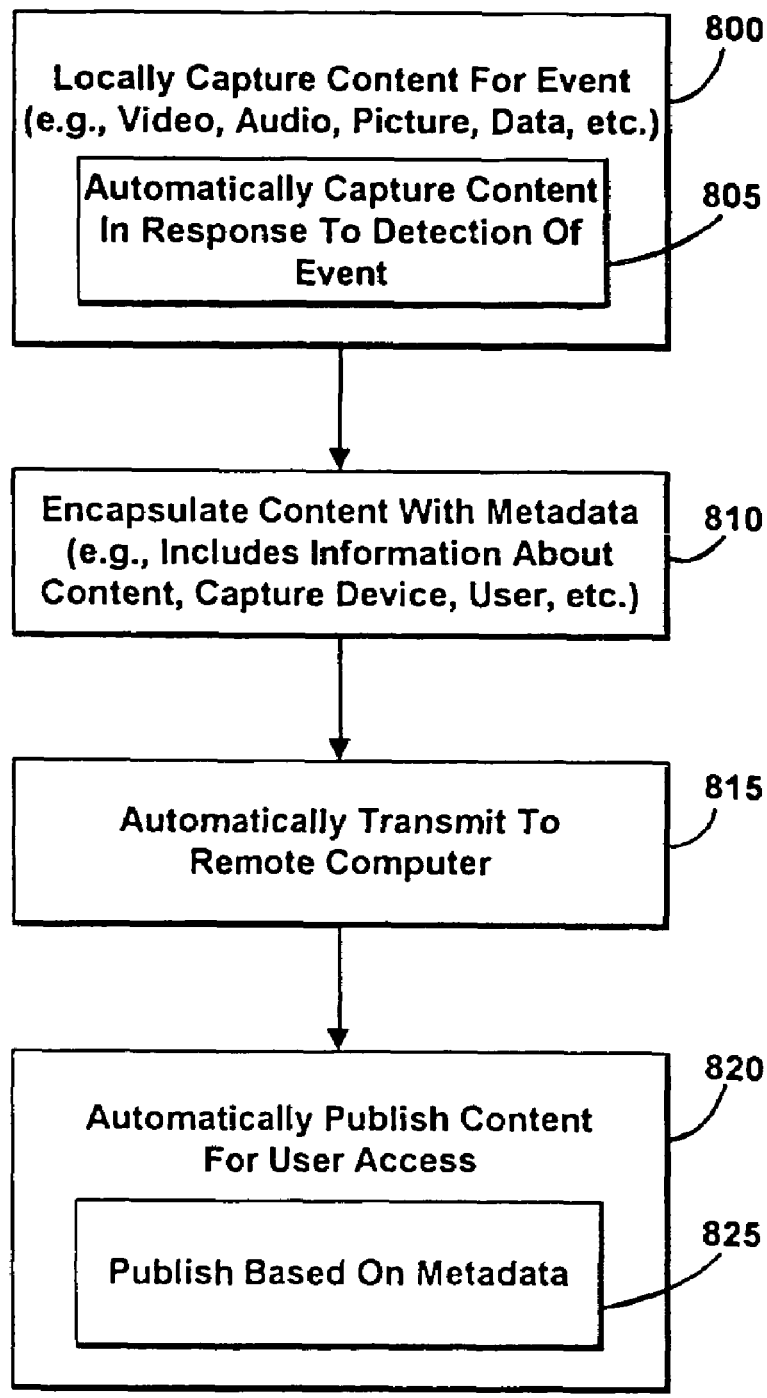
FIG. 8 is a flowchart of illustrative steps involved in capturing content and publishing it with a user associated account in accordance with an embodiment of the present invention.

FIG. 8 is a generalized flowchart of illustrative steps involved in capturing content and publishing it with a user associated account. At step 800, content is captured locally for an event. The content may be any suitable content such as, for example, video, audio, pictures, data, or any other suitable content. The content may be captured by any suitable capture device, such as a video or still camera, microphone, thermometer, scanner, fax, rain gauge, or any other suitable device or appliance for capturing content. The content may be captured continuously, periodically, or in response to a user indication. Content may be captured automatically in response to the detection of an event at step 805. Events may be detected by any suitable sensor such as, for example, a motion sensor, photo-detector, heat sensor, thermostat, carbon monoxide detector, contact sensor, or any other suitable sensor or detector.

At step 810, content is encapsulated with metadata. The metadata may include information about the content, the device that captured the content, the user associated with the capture device, or any other suitable information. In some embodiments, the metadata may include templates and components for generating a user interface for remote control and monitoring of the device. At step 815, the content and, if provided, the metadata, are automatically transmitted to a remote computer such as web server 46, database server 48, or another suitable remote computer.

At step 820, the remote computer automatically publishes the content for user access. The content may be published based on metadata (step 825). For example, the metadata may include information regarding the type of content (i.e., whether the content is a picture, video, text, etc.). The remote computer may publish the content accordingly. Still pictures may be stored, for example, as .tif files and presented as thumbnail or full-size displays. Video may be stored, for example, as .mpg files and presenting the video may cause the user's access device (e.g., client access device 22 or remote user access device 17) to launch a suitable player. Video may also be streamed when provided in real time. Content information may also include display formats, aspect ratios, keywords, or any other suitable information that describes the content. Metadata may include information about the capture device. For example, the metadata may include a user-defined device name for the capture device. When the content is published, the user display (e.g., web page) may indicate the name of the capture device so that the user knows which device captured the content. Metadata may include user information. For example, the user information may indicate the user account to which the content is published. If applicable, the content may be published to one or more user accounts. Metadata may include information about the virtual interface that will represent the capture device. For example, the metadata may include the templates or components for the capture device. Metadata may include event information. For example, the event information may include an event name and time. Event information may be published with the content so that the user knows what type of event occurred and when it happened. As another example, the remote computer may determine what type of notification to provide the user based on the event information. This list is only illustrative, as the metadata may include any other suitable information associated with the content.

Figure 9:
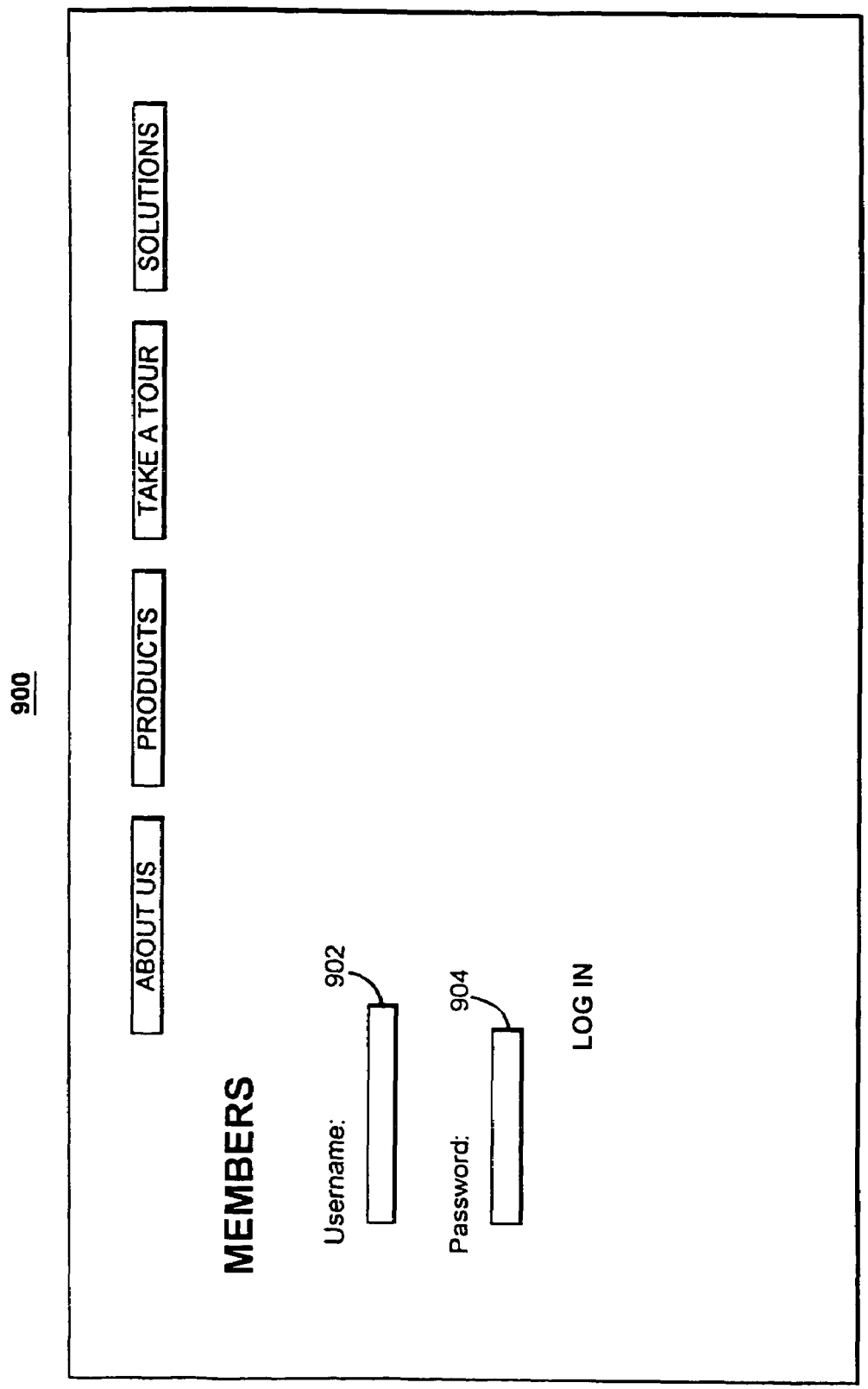
FIG. 9 shows an illustrative display screen for allowing a user to log into a registered account in accordance with an embodiment of the present invention.

FIG. 9 shows an illustrative account login display 900 that may be provided when the user attempts to access his or her account. The user may access his or her account from a client access device 22 or a remote access device 17. For example, system 10 may allow a user to use browser 26 to access a registered account at remote site 14. Before a user is given access they may be prompted to verify their registration with remote site 14 by entering username 902 and password 904.

Figure 10:
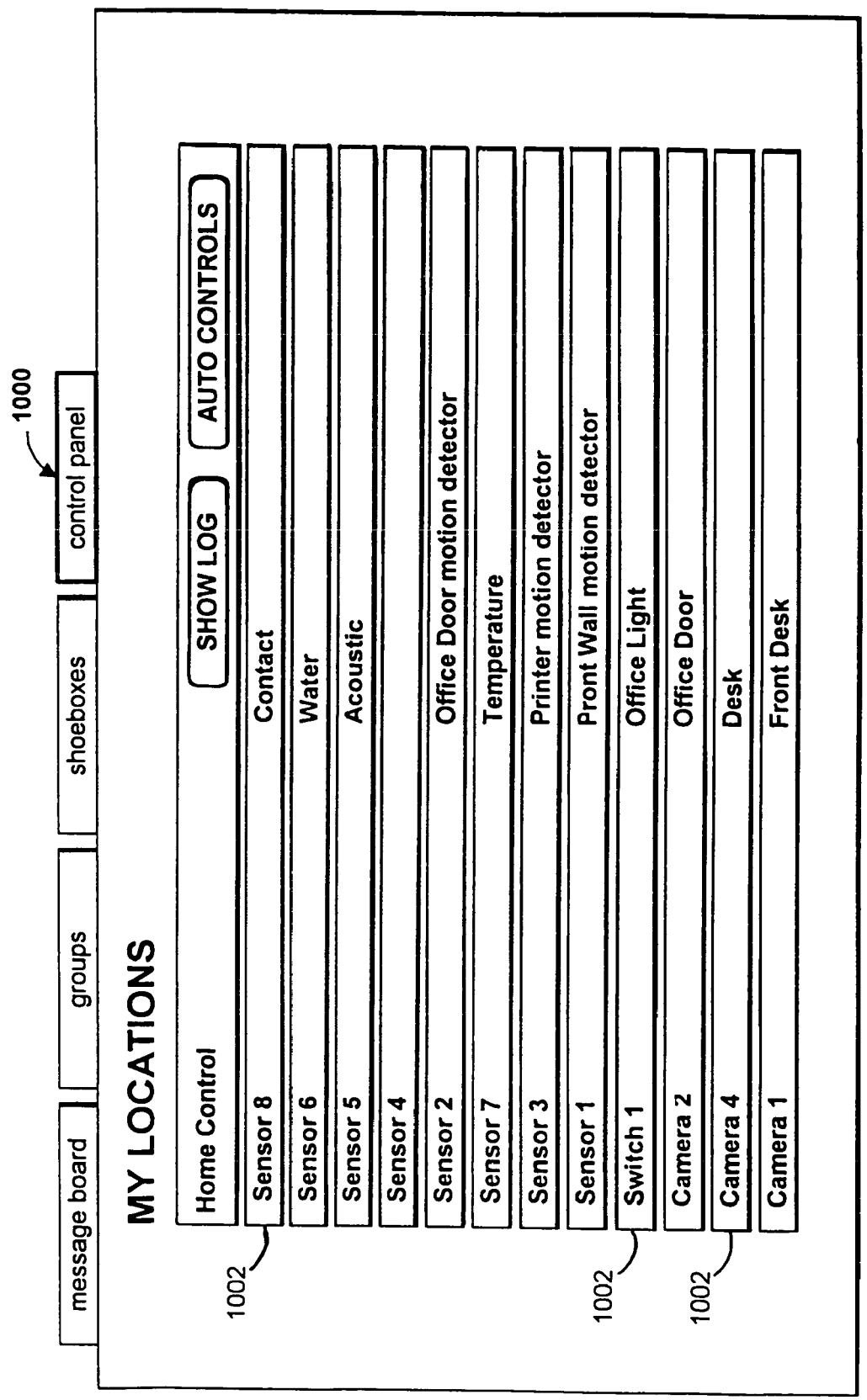
FIG. 10 shows an illustrative display screen for allowing a user to access a control panel listing registered devices in accordance with an embodiment of the present invention.

When the user has successfully logged into his or her account, the user may have access to various features and controls. FIG. 10 shows an illustrative control panel display 1000 that may be provided to allow the user to control devices 32 located at an installation 12 and it may also permit the user to establish device settings. For example, the user may access control panel 1000 that displays registered devices 32 at installation 12 to command light switch 41 (e.g., step 506 and 508 in FIG. 5). A virtual representation of light switch 41 may be made available to the user in control panel 1000 through the selection of device listing 1002 (e.g., step 510 in FIG. 5).

Figure 11:
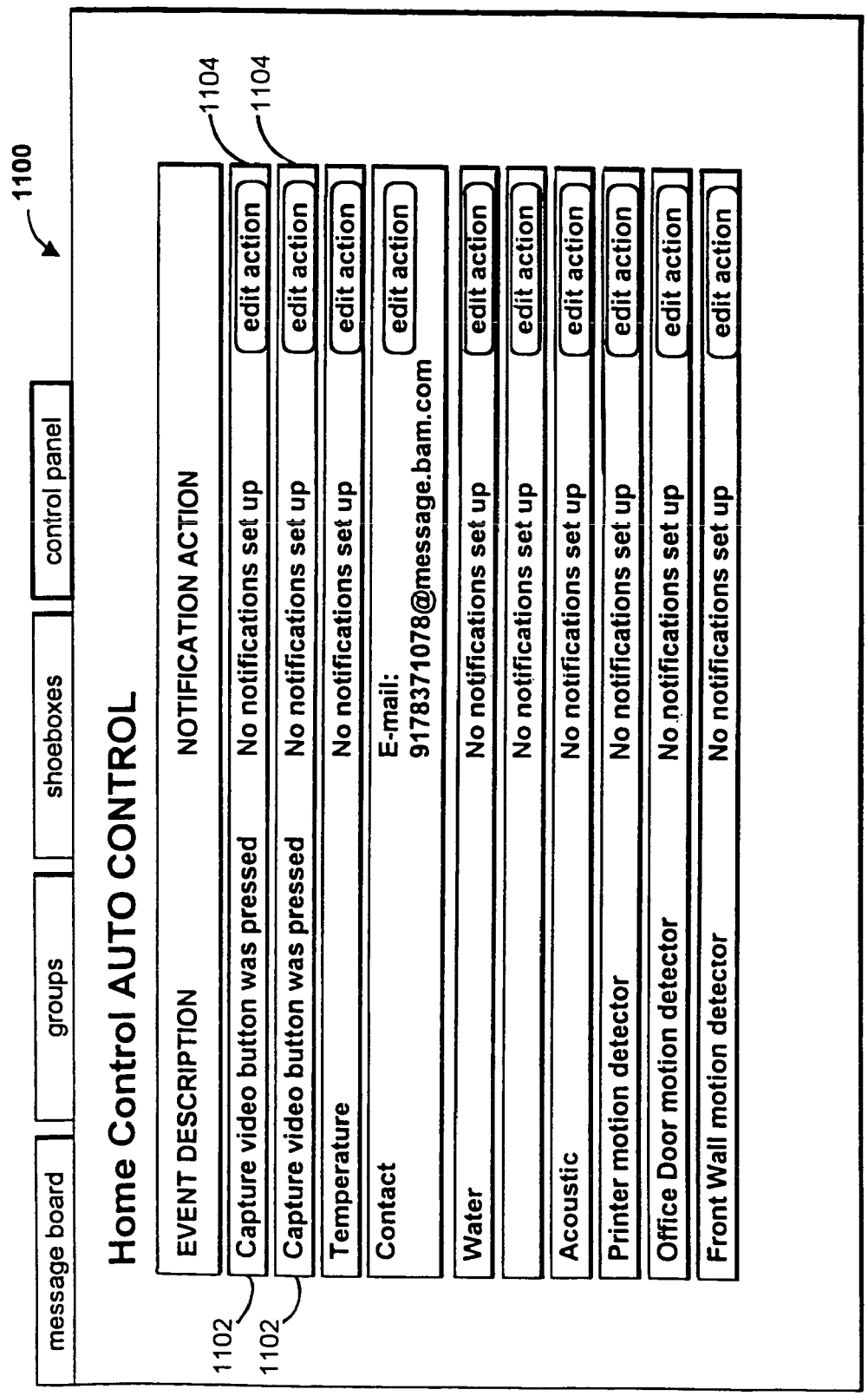
FIG. 11 shows an illustrative display screen for allowing a user to access a control panel for setting notifications in accordance with an embodiment of the present invention.

As demonstrated in FIG. 4b, a user may assign notifications to particular events. FIG. 11 shows an illustrative control panel display 1100 that may be provided to allow the user to set up notification instructions for specific events. In order for the user to access notification options for a particular event listing 1102, the user may select an "edit action" button 1104 for that event. When an event occurs the user will be notified in accordance with the notification instructions assigned to the event. The user may be notified through paging device 43, electronic mail (e-mail), or using any other suitable approach. For example, using the example demonstrated in step 612 of FIG. 6, the user may be notified through paging device 43, when his or her front door sensor is triggered (assuming that the user has assigned a notification instruction with that specific event). The user may then, if he or she wishes, access his or her account from any browser 26 accessible location to acquire additional information about that particular event occurrence (e.g., video feed from a camera, time of the event, etc.).

Figure 12:
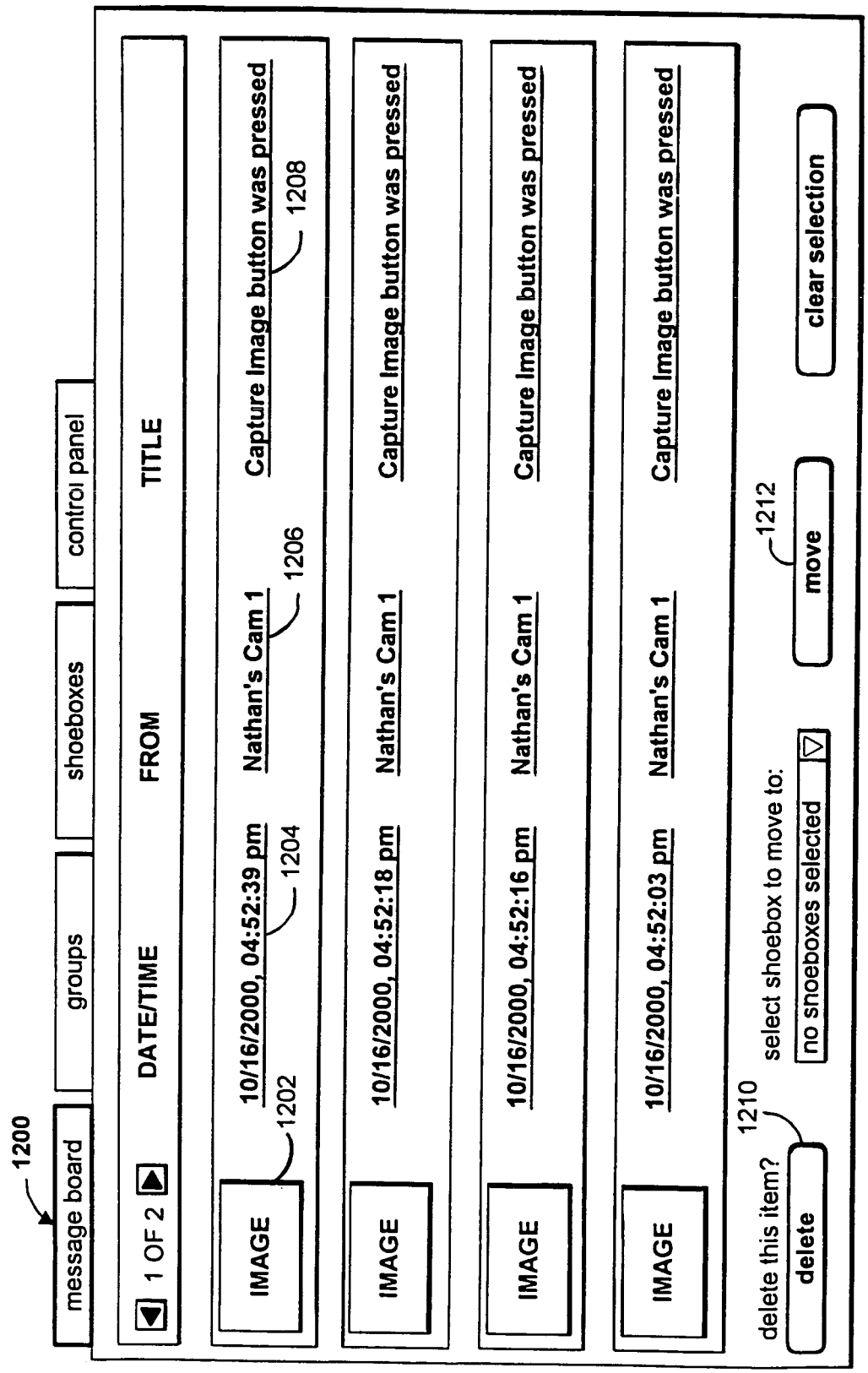
FIG. 12 shows an illustrative display screen for allowing a user to access a message board to view events in accordance with an embodiment of the present invention.

FIGS. 12-19 are illustrative displays for providing users with access to remote devices and captured content in accordance with one embodiment of the present invention. In practice, any suitable display and combination of passive and active user interface features may be used. In some embodiments, the displays of FIGS. 12-19 may be incorporated into web pages accessible by a browser. In such embodiments, the browser may supplement the displays with browser elements such as, for example, toolbars. FIG. 12 shows an illustrative message board display 1200 that may be provided to allow the user to view the captured content and its relevant data. Message board 1200 may display event information, which may consist of, but is not limited to, a photo thumbnail 1202, date and time of event occurrence 1204, the device source 1206 the event was captured on, and a title 1208 that may have been issued in reference to the event. Event titles may be user configurable. By selecting a particular event information feature the user may acquire additional information. For example, if the user selects photo thumbnail 1202 a video clip may be played back to the user of the event that triggered the upload of content.

Message board 1200 may also incorporate additional features such as delete button 1210 to remove collected messages on message board 1200, move button 1212 to relocate specific captured content to another part of the user's account, or any other applicable features that may be useful in viewing content collected on message board 1200.

Figure 13:
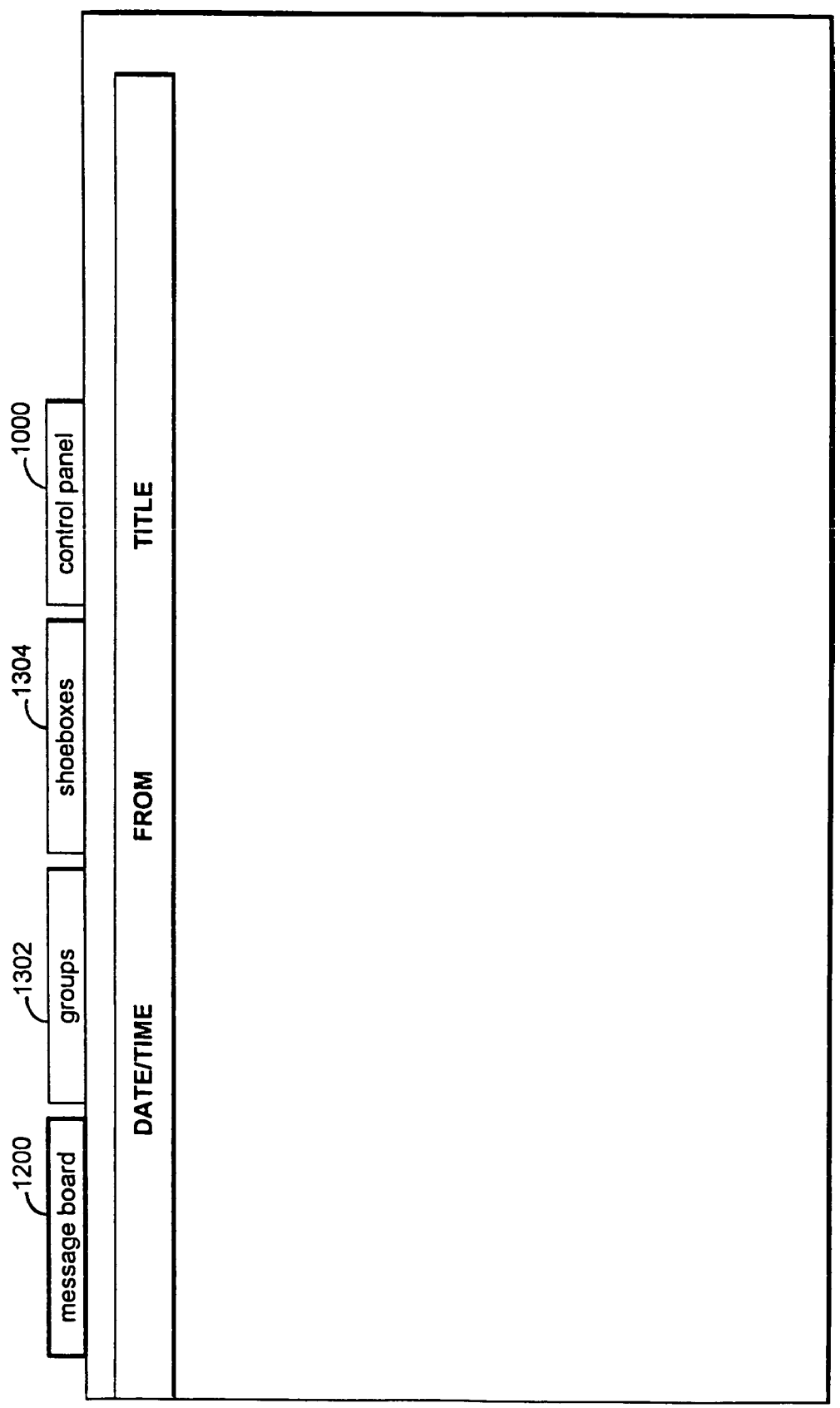
FIG. 13 shows an illustrative display of user options in accordance with an embodiment of the present invention.

FIG. 13 shows an illustrative display 1300 that may provide the user with various account options. Display 1300 provides access to control panel 1000 (discussed in FIGS. 10 and 11), message board 1200 (discussed in FIG. 12), and additional features such as, for example, a groups feature 1302 and a "shoeboxes" feature 1304.

Groups feature 1302 may allow the user an ability to share access with other parties of interest. The user, for example, may want to share captured content with another registered user. Through groups feature 1302, the user may transfer data, upload data, send a message, start a chat session, or any other applicable actions. The "shoeboxes" feature 1304 may allow the user to maintain and organize collected photos, events data (i.e., captured content), or any other applicable data that the user may want to incorporate into his or her account.

Figure 14:
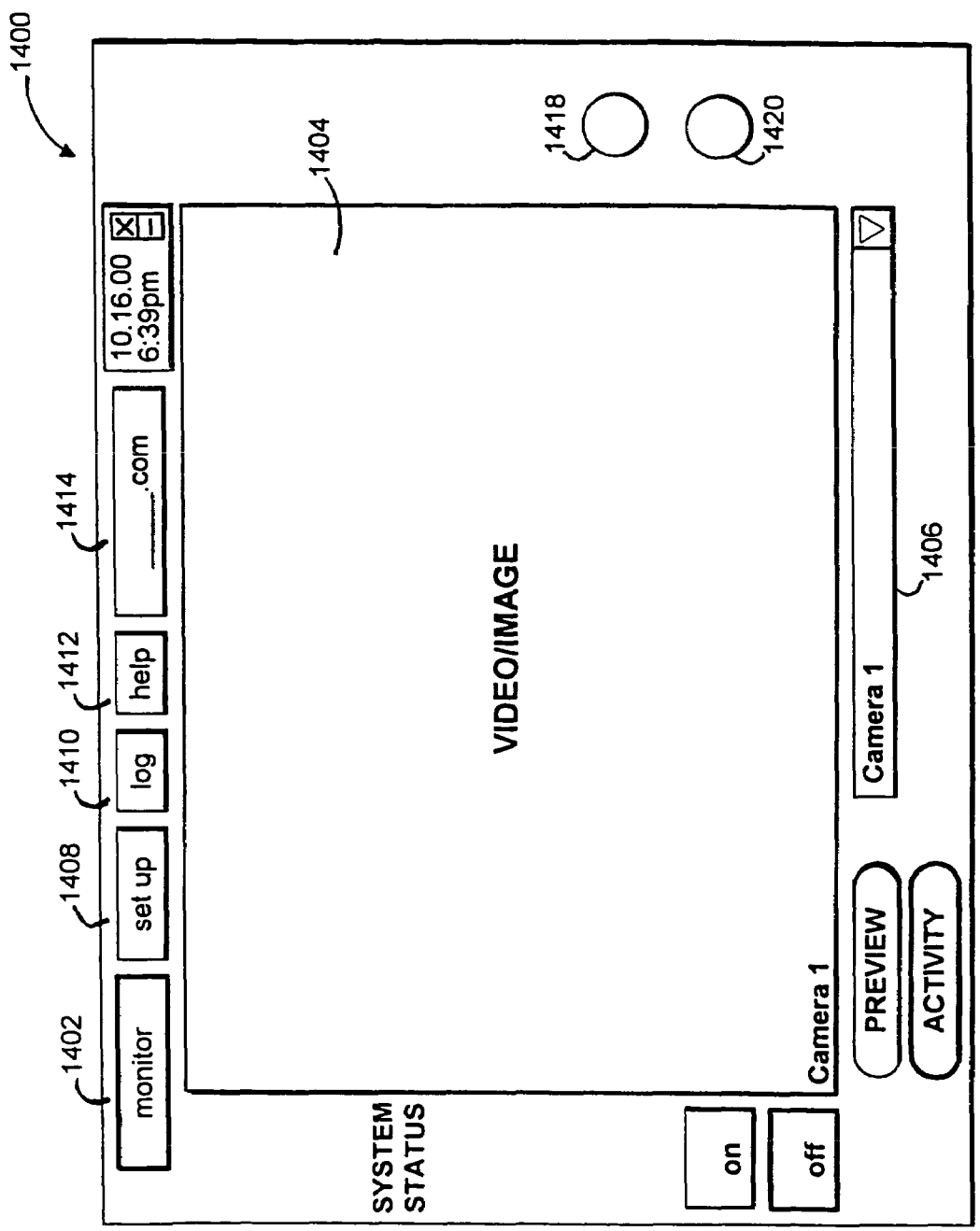
FIG. 14 shows an illustrative display for providing a user with an opportunity to locally capture content in accordance with an embodiment of the present invention.
Figure 15:
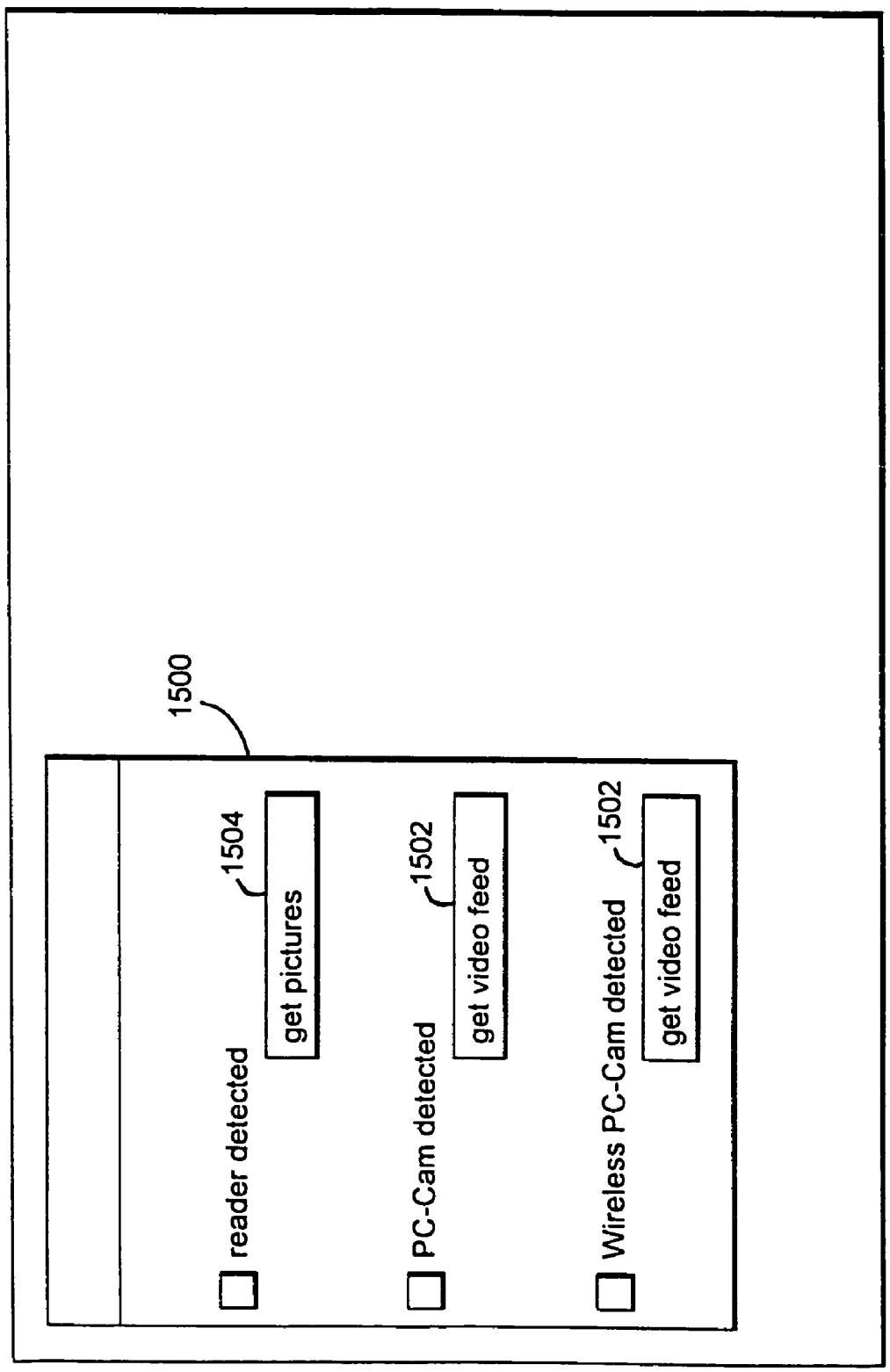
FIG. 15 shows an illustrative display for indicating detected devices in accordance with an embodiment of the present invention.

FIGS. 14 and 15 show illustrative displays 1400 and 1500 for providing a monitoring menu and detection menu, respectively, on client device 22 within installation 12. "Home Control" application software may allow the user to monitor and control devices, run set-up options, and provide a link to the user's account at remote site 14. Furthermore, "home control" software may consist of a plurality of views and menu options.

FIG. 14, shows illustrative monitoring menu 1400 which may incorporate options such as, for example, local activity monitor 1402 for monitoring a selected device on video/image display 1404, a device menu 1406 for selecting a plurality of different devices, setup menu 1408, log menu 1410 for viewing a record of events, help menu 1412, and link menu 1414 that may provide access (e.g., through the use of a browser) to remote site 14. Furthermore, monitoring menu 1400 may also include system status monitor 1416. System status monitor 1416 may inform the user of current uploads to remote site 14. For example, the user may capture an image or collect video feed by selecting a device from device menu 1406 and utilizing the capture buttons 1418 or 1420. Once device 32 has executed the capturing of content, the user may choose to upload that content to remote site 14. System status monitor 1416 may verify a successful upload.

FIG. 15 shows illustrative detection menu 1500. Detection menu 1500 may indicate detected local capture devices 32 and captured content. The content may have been stored locally in a temporary gallery on client access device 22. For example, "get video feed" buttons 1502 may be used to activate any of the detected devices 32. In response to the user selecting a detected device 32 and its associated "get video feed" button 1502, monitoring menu 1400 may be displayed (as discussed above) to provide the user with a video display and allows the user control of that device 32.

Figure 16:
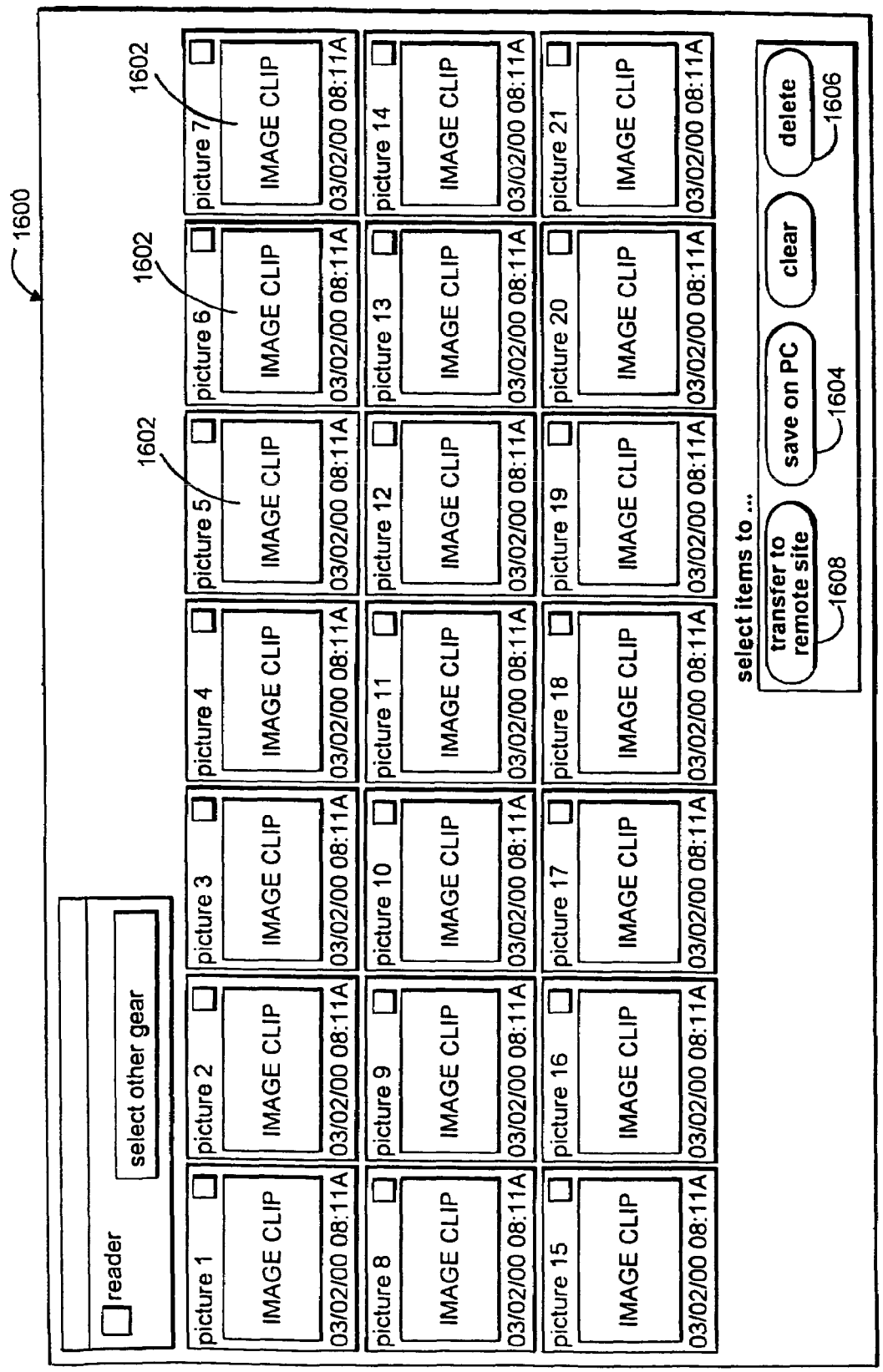
FIGS. 16-18 show illustrative image gallery displays of content in accordance with an embodiment of the present invention.

Once the user has activated a specific device from detection menu 1500, monitoring menu 1400 may be displayed and the user may use capture buttons 1418 or 1420 to collect content. The captured content may be stored in an temporary gallery for evaluation at a later time. If the user wishes to access the temporary gallery the user may utilize "get pictures" button 1504. In response, an illustrative display, as shown in FIG. 16, may provide the user with photo gallery menu 1600. Photo gallery menu 1600 may display collected image clips 1602. The user may use this menu to perform selected features such as, for example, save images 1604 locally on client device 22, delete images 1606 from the gallery, transfer images 1608 to the user's registered account on remote site 14, or perform any other applicable actions.

Figure 17:
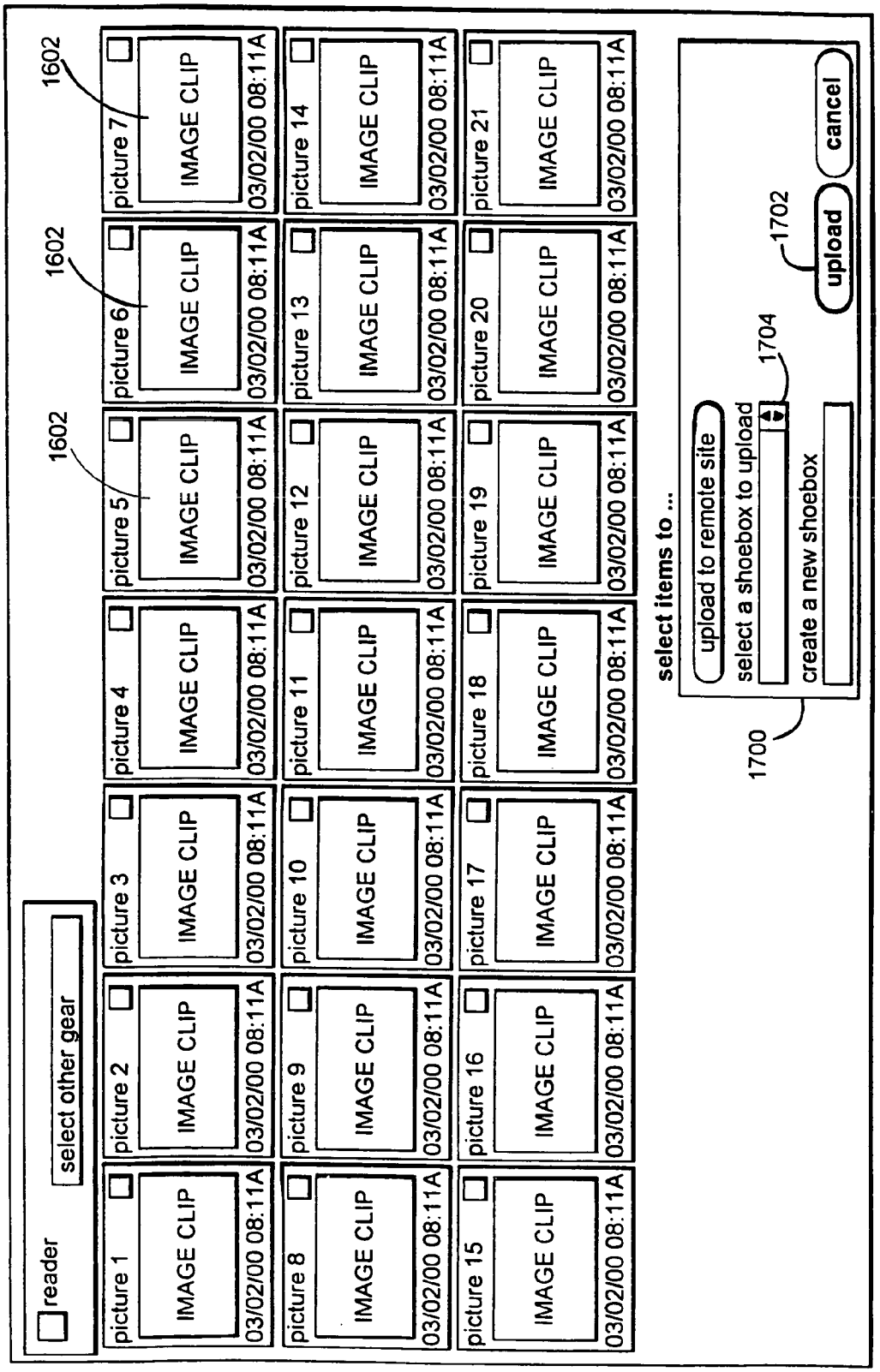
Figure 18:
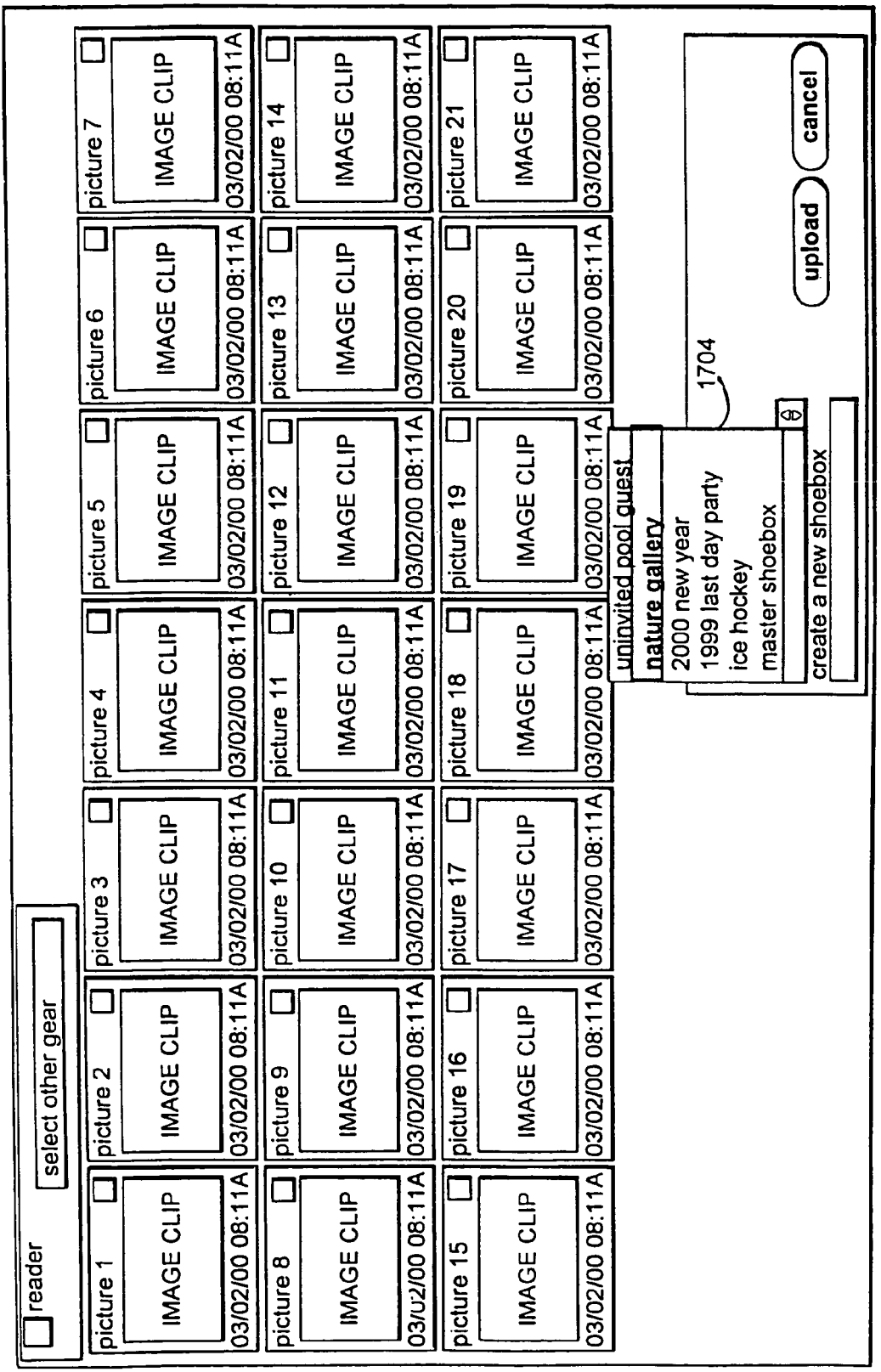
Figure 19:
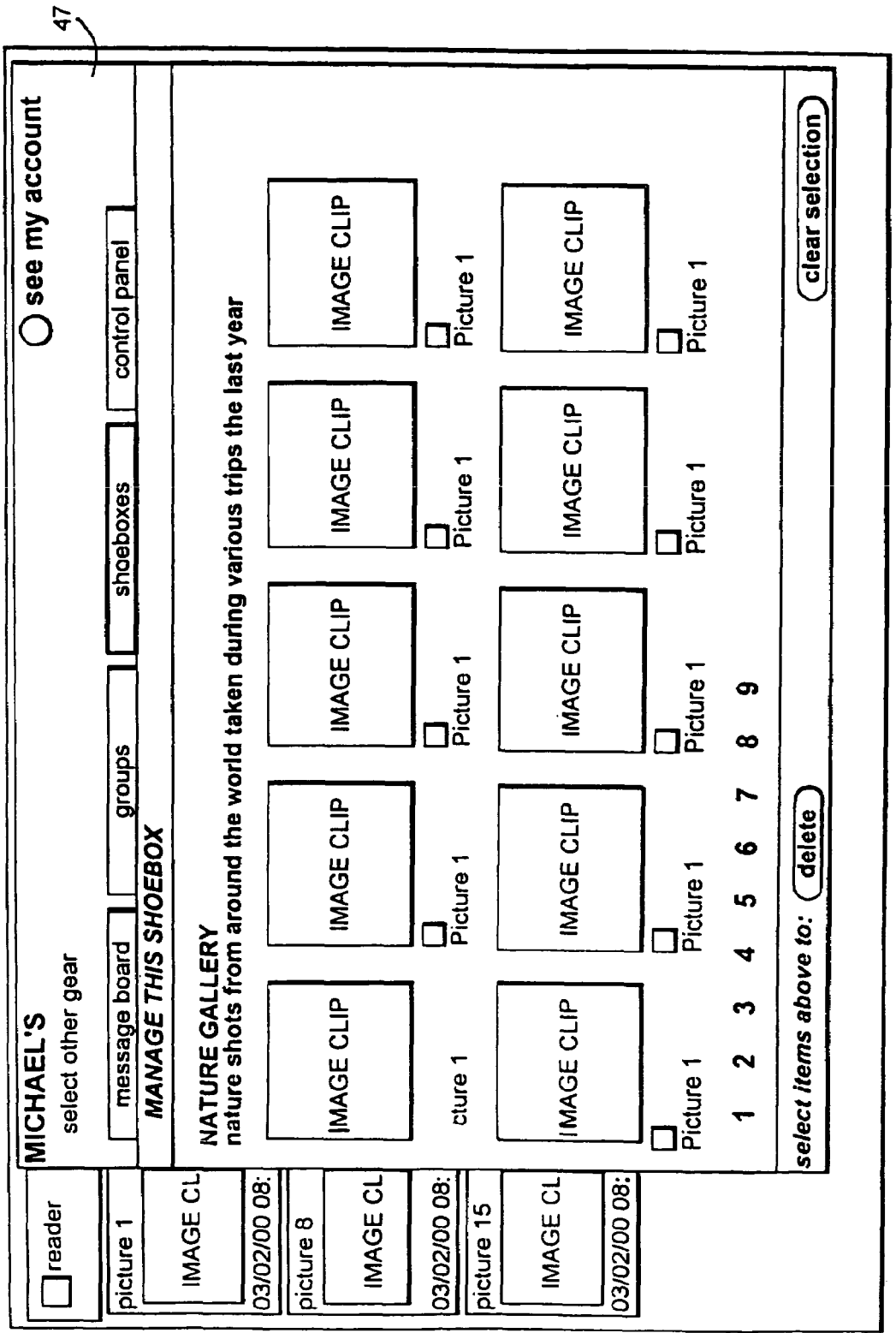
FIG. 19 shows an illustrative display for providing users with access to uploaded content in accordance with an embodiment of the present invention.

FIG. 17 shows another illustrative photo gallery display 1600 that demonstrates upload menu 1700 which provides a user the ability to upload collected image clips to his or her account at remote site 14. In response to the user selecting transfer button 1608, the upload menu 1700 may be provided. In upload menu 1700, the user may select specific image clips 1602 from any picture gallery using, for example, "shoebox" menu 1704 in FIG. 18. Once the user has selected which image gallery and which images he would like to upload to his or her account, the user may use the upload button 1702 to connect to remote site 14. When remote site 14 is contacted, the user's account is opened (e.g., through browser 26) and "shoeboxes" feature 1304 may be automatically selected from the user's account to display uploaded image clips 1602.

Thus, systems and methods for the automatic upload of content based on captured events are provided. One skilled in the art will appreciate that the present invention can be practiced by other than the described embodiments, which are presented for purposes of illustration and not of limitation, and the present invention is limited only by the claims which follow.

What is claimed is:

1. A method for providing remote access to captured content, comprising:
   automatically registering a capture device with a remote computer over a communications network, wherein the automatic registration associates the capture device with user information;
   locally capturing content for an event using the capture device;
   automatically encapsulating the content with metadata, wherein the metadata includes information about the capture device, the content, the event, and the user information;
   automatically transmitting the content encapsulated with metadata from the capture device to the remote computer over the communications network;
   processing the metadata encapsulating the content at the remote computer, wherein the processing comprises:
      automatically associating the content with a user account according to the user information included with the metadata;
      automatically publishing the content on the remote computer according to the information about the capture device, the content, and the event included with the metadata, wherein the remote computer comprises a database comprising locally captured content associated with user accounts and publishing the content comprises updating the database with the content;
      automatically generating a textual notification at the remote computer in response to publishing the content, wherein the notification indicates that the published content has been published on the remote computer and includes the information about the event included with the metadata;
      automatically transmitting the generated textual notification from the remote computer to a user associated with the user account;
      allowing the user to access the published content and current status information for the capture device on the remote computer with a user access device, wherein the current status information comprises data on a state of the capture device;
      allowing the user to send a command from the user access device to the capture device via the remote computer in order to change the state of the capture device;
   wherein:
      the capture device has an associated virtual interface; the metadata includes information about the virtual interface; and
      publishing the content on remote computer comprises providing the user with access to the content using the virtual interface according to the metadata.

2. The method defined in claim 1 wherein capturing content comprises capturing content without persistently storing the content.

3. The method defined in claim 1 wherein:
   publishing the content further comprises automatically publishing the content to a plurality of user accounts on the remote computer; and
   providing the content further comprises providing the content to user access devices of users associated with the plurality of user accounts.

4. The method defined in claim 1 wherein:
   the method further comprises detecting the event with a sensor; and
   locally capturing content comprises automatically capturing the content in response to the detection of the event by the sensor.

5. The method defined in claim 4 wherein the sensor is a motion sensor, a contact sensor, a smoke sensor, a humidity sensor, a water emersion sensor, a radon sensor, a temperature sensor, an audio sensor, a carbon monoxide sensor, an infrared sensor, or a radiation sensor.

6. The method defined in claim 1 wherein the capture device is a video camera, a still camera, a microphone, or a temperature gauge.

7. The method defined in claim 1 wherein the content includes picture, video, or text.

8. A system for providing remote access to captured content comprising:
   a capture device configured to locally capture content;
   a monitoring module configured to:
      automatically register the capture device with a remote computer over a communications network, wherein the automatic registration associates the capture device with user information;
      automatically encapsulate the content with metadata, wherein the metadata includes information about the capture device, the content, the event, and the user information; and
      automatically provide the content to the remote computer from the capture device over the communications network;
   the remote computer configured to process the metadata encapsulating the content, wherein the processing comprises:
      automatically associating the content with a user account according to the user information included with the metadata eel;
      automatically publishing the content according to the information about the capture device, the content, and the event included with the metadata, wherein the remote computer comprises a database comprising locally captured content associated with user accounts and publishing the content comprises updating the database with the content;
      automatically generating a textual notification in response to publishing the content, wherein the notification indicates that the published content has been published on the remote computer and includes the information about the event included with the metadata; and
      automatically transmitting the generated textual notification to a user associated with the user account;

a user access device configured to:
  allow the user to access the published content and current status information for the capture device on the remote computer, wherein the current status information comprises data on a state of the capture device;
  allow the user to send a command from the user access device to the capture device via the remote computer in order to change the state of the capture device;
wherein:
  the capture device has an associated virtual interface;
  the metadata includes information about the virtual interface; and
  the remote computer is further configured to publish the content according to the information about the virtual interface.

9. The system defined in claim 8 wherein the capture device captures content without persistently storing the content.

10. The system defined in claim 8 wherein:
the remote computer is further configured to automatically publish content to a plurality of user accounts on the remote computer; and
the user access device is further configured to provide content to users associated with the plurality of user accounts.

11. The system defined in claim 8 wherein:
the system further comprises a sensor configured to detect an event; and
the capture device is further configured to locally capture the content in response to the detection of the event by the sensor.

12. The system defined in claim 11 wherein the sensor is a motion sensor, a contact sensor, a smoke sensor, a humidity sensor, a water emersion sensor, a radon sensor, a temperature sensor, an audio sensor, a carbon monoxide sensor, an infrared sensor, or a radiation sensor.

13. The system defined in claim 8 wherein the capture device is a video camera, a still camera, a microphone, or a temperature gauge.

14. The system defined in claim 8 wherein the content includes picture, video, or text.

15. A system for providing remote access to captured content comprising:
  means for automatically registering a capture device with a remote computer over a communications network, wherein the automatic registration associates the capture device with user information;
  means for locally capturing content for an event using the capture device;
  means for automatically encapsulating the content with metadata, wherein the metadata includes information about the capture device, the content, the event, and the user information;
  means for automatically transmitting the content encapsulated with metadata to he remote computer over the communications network;
  means for processing the metadata encapsulating the content at the remote computer, wherein the means for processing comprises:
    means for automatically associating the content with a user account according to the user information included with the metadata;
    means for automatically publishing the content to the remote computer according to the information about the capture device, the content, and the event included with the metadata, wherein the remote computer comprises a database comprising locally captured content associated with user accounts and publishing the content comprises updating the database with the content;
    means for automatically generating a textual notification at the remote computer in response to publishing the content, wherein the notification indicates that the published content has been published on the remote computer and includes the information about the event included with the metadata;
    means for automatically transmitting the generated textual notification from the remote computer to a user associated with the user account;
    means for allowing the user to access the published content and current status information for the capture device on the remote computer with a user access device, wherein the current status information comprises data on a state of the capture device;
    means for allowing the user to send a command from the user access device to the capture device via the remote computer in order to change the state of the capture device;
wherein:
  the capture device has an associated virtual interface;
  the metadata includes information about the virtual interface; and
  the means for publishing the content on the web site comprises means for providing the user with access to the content using the virtual interface according to the metadata.

16. The system defined in claim 15 wherein the means for capturing content without persistently storing the content comprises the capture device.

17. The system defined in claim 15 wherein:
the means for automatically publishing the content further comprises means for publishing the content to a plurality of user accounts on the remote computer; and
the means for providing the content further comprises means for providing the content to user access devices of users associated with the plurality of user accounts.

18. The system defined in claim 15 wherein:
the system further comprises means for detecting the event; and
the means for locally capturing content comprises means for automatically capturing the content in response to the detection of the event by the means for detecting.

19. The system defined in claim 18 wherein the means for detecting comprises a motion sensor, a contact sensor, a smoke sensor, a humidity sensor, a water emersion sensor, a radon sensor, a temperature sensor, an audio sensor, a carbon monoxide sensor, an infrared sensor, or a radiation sensor.

20. The system defined in claim 15 wherein the means for capturing comprises a video camera, a still camera, a microphone, or a temperature gauge.

21. The system defined in claim 15 wherein the content comprises picture, video, or text.

* * * * *